(12) United States Patent
Somani et al.

(10) Patent No.: US 11,526,523 B2
(45) Date of Patent: Dec. 13, 2022

(54) COMPUTER-BASED SYSTEMS FOR DATA ENTITY MATCHING DETECTION BASED ON LATENT SIMILARITIES IN LARGE DATASETS AND METHODS OF USE THEREOF

(71) Applicant: American Express Travel Related Services Company, Inc., New York, NY (US)

(72) Inventors: Arpan Somani, Ratlam (IN); Salil Rajeev Joshi, Bangalore (IN); Shourya Roy, Bangalore (IN)

(73) Assignee: American Express Travel Related Services Company, Inc., New York, NY (US)

( * ) Notice: Subject to any disclaimer, the term of this patent is extended or adjusted under 35 U.S.C. 154(b) by 28 days.

(21) Appl. No.: 17/160,889

(22) Filed: Jan. 28, 2021

(65) Prior Publication Data
US 2021/0248149 A1    Aug. 12, 2021

(30) Foreign Application Priority Data
Feb. 12, 2020   (IN) .............................. 202041006056

(51) Int. Cl.
*G06F 16/2457*  (2019.01)
*G06N 20/20*    (2019.01)
*G06F 40/30*    (2020.01)
*G06F 16/22*    (2019.01)
*G06F 40/284*   (2020.01)

(52) U.S. Cl.
CPC .... *G06F 16/24578* (2019.01); *G06F 16/2255* (2019.01); *G06F 40/284* (2020.01); *G06F 40/30* (2020.01); *G06N 20/20* (2019.01)

(58) Field of Classification Search
None
See application file for complete search history.

(56) References Cited

U.S. PATENT DOCUMENTS

| | | | |
|---|---|---|---|
| 2019/0065470 A1* | 2/2019 | Matthews | G06F 40/30 |
| 2019/0311301 A1* | 10/2019 | Pyati | G06F 16/901 |
| 2020/0394455 A1* | 12/2020 | Lee | G06K 9/6259 |
| 2021/0065042 A1* | 3/2021 | Gopalan | G06F 40/205 |
| 2021/0142191 A1* | 5/2021 | Faruquie | G06N 20/00 |

* cited by examiner

*Primary Examiner* — Robert W Beausoliel, Jr.
*Assistant Examiner* — Cheryl M Shechtman
(74) *Attorney, Agent, or Firm* — Sterne, Kessler, Goldstein & Fox P.L.L.C.

(57) ABSTRACT

At least some embodiments are directed to an entity matching detection system. The entity matching detection system includes a latent similarity identification machine learning model that receives one or more data records and generates a final similarity score indicative of a latent similarity between the one or more data records and a second data record. The entity matching detection system can identify lexical and semantic similarities between attribute values and can analyze and compute similarity scores for direct-linked attribute values and cross-linked attribute values extracted from different data records.

20 Claims, 17 Drawing Sheets

N-Grams Generation

➢ "UBER" ➔ ["UBE", "BER"]
➢ "UBER LLC" ➔ ["UBE", "BER", "ERL", "RLL", "LLC"]
➢ "BERGER" ➔ ["BER", "ERG", "RGE", "GER"]

⎫
⎬ 601
⎭

Average Precision (Correctly distinguishes between True/False matches)

603A ⟶ AP("UBER", "UBER LLC") = (1/1 + 2/2) / 2 = 1
605A ⟶ AP("UBER", "BERGER") = (0/1 + 1/2) / 2 = 0.25

Edit Distance (Fails to distinguish between True/False matches)

603B ⟶ EditDistance("UBER", "UBER LLC") = 4
605B ⟶ EditDistance("UBER", "BERGER") = 4

FIG. 6

N-Grams Generation

⟩ "UBER" → ["UBE", "BER"]
⟩ "UBER LLC" → ["UBE", "BER", "ERL", "RLL", "LLC"]
⟩ "BERGER" → ["BER", "ERG", "RGE", "GER"]

} 801

Jaccard Similarity (Correctly distinguishes between True/False matches)

803A → JA("UBER", "UBER LLC") = 2/5 = 0.4
805A → JA("UBER", "BERGER") = 1/5 = 0.2

Edit Distance (Fails to distinguish between True/False matches)

803B → EditDistance("UBER", "UBER LLC") = 4
805B → EditDistance("UBER", "BERGER") = 4

COMPUTER-BASED SYSTEMS FOR DATA ENTITY MATCHING DETECTION BASED ON LATENT SIMILARITIES IN LARGE DATASETS AND METHODS OF USE THEREOF

CLAIM OF PRIORITY

This application claims priority to co-pending Indian provisional application entitled, "COMPUTER-BASED SYSTEMS FOR DATA ENTITY MATCHING DETECTION BASED ON LATENT SIMILARITIES IN LARGE DATASETS NAD METHODS OF USE THEREOF", having application No. 202041006056 filed on Feb. 12, 2020, which is entirely incorporated herein by reference.

BACKGROUND OF TECHNOLOGY

Big data is a field that addresses ways to analyze, systematically extract information from, or otherwise deal with data sets that are too large or complex to be dealt with by traditional data-processing application software.

SUMMARY OF DESCRIBED SUBJECT MATTER

In some embodiments, the present disclosure provides a technically improved computer-based entity matching detection system. The entity matching detection system can receive a first data record from a computing device, the first data record can include a first set of attribute values. The entity matching detection system can retrieve from a hash index database a second set of attribute values based on the first set of attribute values, wherein at least one first attribute value from the first set of attribute values is associated with at least one second attribute value from the second set of attribute values. Thereafter, the entity matching detection system can retrieve from a records database a plurality of second data records based on the second set of attribute values and generate a third set of attribute values based on the second set of attribute values, and the plurality of second data records. The third set of attribute values is distinct from the first set of attribute values. The entity matching detection system can generate a set of similarity scores. The set of similarity scores can include similarity scores between each attribute value of the first set of attribute values and each attribute value of the third set of attribute values. The entity matching detection system can generate a final similarity score indicative of a latent similarity between the first data record and a second data record of the plurality of second data records, by inputting into a trained latent similarity identification machine learning model: the first set of attribute values, the third set of attribute values, and the set of similarity scores. The entity matching detection system can identify a similar second data record of the plurality of second data records that is related to the first data record based on the final similarity score.

In some embodiments, the first data record and the second data record are associated with a same entity.

In some embodiments, the similarity scores include lexical similarity scores and semantic similarity scores. The similarity scores can include similarity scores of Cross-linked and Direct-linked attribute pairs extracted from the first data record and the second data record.

In some embodiments, the trained latent similarity identification machine learning model can be implemented based on a supervised ensemble machine learning technique.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

FIGS. 1-17 show one or more schematic flow diagrams, certain computer-based architectures, and/or implementations which are illustrative of some examples of aspects of at least some embodiments of the present disclosure.

DETAILED DESCRIPTION

Figure 1:
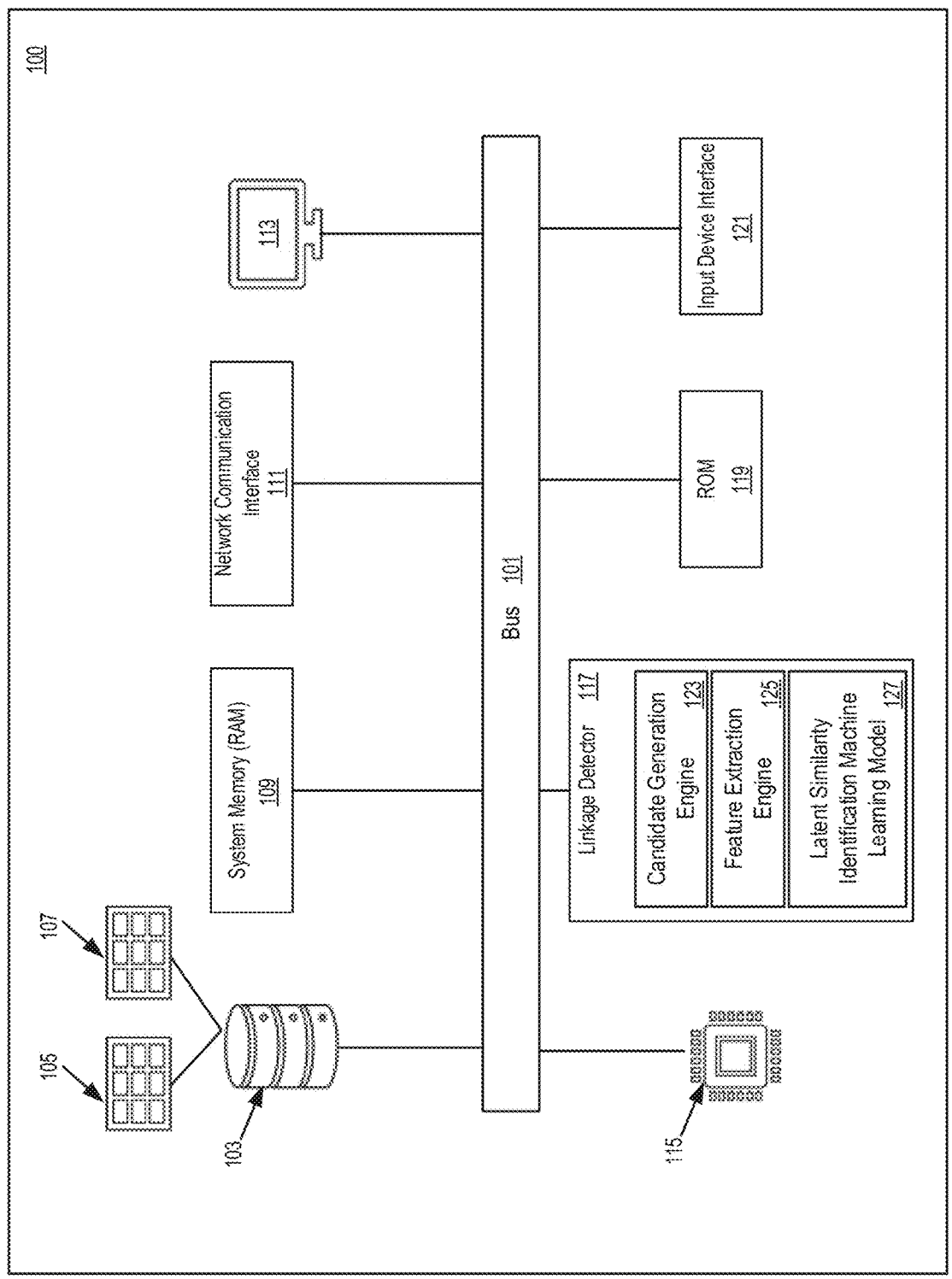

Various detailed embodiments of the present disclosure, taken in conjunction with the accompanying figures, are disclosed herein; however, it is to be understood that the disclosed embodiments are merely illustrative. In addition, each of the examples given about the various embodiments of the present disclosure is intended to be illustrative, and not restrictive.

FIGS. 1 through 17 illustrate computer based systems and methods for entity matching detection based on identification of latent similarities between datasets.

Entity matching problems are common in product inventory systems (to identify duplicate products), citation databases (to identify different bibliographic entries of the same scholarly work), and financial institution systems. For example, in the financial service domain, financial institutions hold multiple accounts, multiple credit cards, mortgages, and/or insurances for various individuals and the like. In such environments, records belonging to the same entity may be treated as belonging to different entities because legacy and disparate management systems lead to poor management system performance and disinformation.

Misidentification of data assets is a technical problem that can originate from incorrect or incomplete information stored in, for example, large databases. Misidentification of data assets can also originate from the inability of data systems to identify similarities between data that may be textually different but semantically equivalent or related. In general, misidentification of data assets may contribute to the technical problem of entity matching, i.e., the task of identifying data records which refer to or are associated with the same person or non-person entity.

As explained in more detail below, the technical solutions disclosed herein include aspects of computational techniques to identify latent similarities between data records, increase data coverage utilized during data identification processes by analyzing Direct-linked and Cross-linked attribute values, and reduce data misidentifications. The technical solutions disclosed herein also include systems and methods that capture data similarity across data records through complete linkage over attributes by analyzing Cross-linked attribute pairs in combination with Direct-linked attribute pairs. Direct-linked attributes are attribute pairs with the same name or type, e.g., comparing names with names, or price with price. Cross-linked attribute pairs are attribute pairs that can be related but are not the same, e.g., email IDs sharing information with names. The technical solutions described herein are also agnostic to data schema differences, number of attributes, and can compare datasets where multiple attributes hold similar information.

As used herein, the term "latent features" refers to features that are not directly observed but rather inferred (e.g., through mathematical model) from other features that are observed. As used herein, the term "latent similarity" refers to a degree of similarity computed based on latent features shared between two or more attribute values or data records.

As used herein, a data record may refer to a set of {attribute, attribute value} pairs. The data type of the values can be different, such as numerical, categorical, date-time, textual, and other suitable types of data type.

FIG. 1 illustrates an example of an implementation of an entity matching detection system, in accordance with one or more embodiments of the present disclosure. In some embodiments, the entity matching detection system 100 can include a communication bus 101, a processor 115, a linkage detector 117, a system memory (RAM) 109, a read-only memory (ROM) 119, a record database 103, an input device interface 121, an output device interface such as display 113, and a network communication interface 111.

In some embodiments, the communication bus 101 collectively represents system, peripheral, and/or chipset buses that communicatively connect the numerous internal devices of the system 100. The communication bus 101 may be a physical interface for interconnecting the various components. In some embodiments, the communication bus 101 may be a network interface, router, switch, or other communication interface.

In some embodiments, the system 100 may include a processor 115 configured to perform instructions provided via the bus 101 by, e.g., accessing data stored in memories 109 and 119 via the communication bus 101. In some embodiments, the Read-Only-Memory (ROM) 119 may include a non-volatile storage device, such as, e.g., a magnetic disk hard drive, a solid-state drive, flash memory, or other non-volatile memory and combinations thereof. In some embodiments, system memory 109 may include a volatile memory, such as, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, among other data related to the operation of system 100.

In some embodiments, a record database 103 can store data record sets 105 and 107. In some embodiments, the system 100 may receive, store, or have access to multiple data records stored in the record database 103. Data record sets 105 and 107 can include multiple attributes and attribute values. Such data records can be associated with the same or different persons, and/or non-person entities. For example, data record set 105 can include attributes and attribute values associated with a seller or merchant, e.g., data record set 105 can include attributes such as seller-email, seller ID, seller address, seller phone, seller zip code, seller name, and other suitable seller or merchant related attributes or any combination thereof. Each attribute can have an attribute value, for example, the seller email attribute can have an attribute value of "oneseller@myemail.com," the seller ID attribute can have and attribute value of "S128" and so on. Likewise, data record set 107 can include attributes and attribute values associated with a customer (e.g., customer email, customer name, customer address, customer phone number, customer zip code, or other suitable customer related attributes). It is noted, that the seller data record set may have different attributes and attribute values than the customer data record set. For instance, the seller data record set may include a seller's permit attribute that would not be included in the customer data record set. Likewise, the customer data record can include a spouse name attribute value not included in a seller data record. It is also noted that, while the examples below are discussed in the context of data records associated with sellers and customers, however, applications of various methods and systems described herein do not depend on a specific type of data records or attributes.

In some embodiments, the linkage detector 117 determines one or more latent similarities between two or more data records. In some implementations, the linkage detector 117 can include a candidate generation engine 123, a feature extraction engine 125, and a latent similarity identification machine learning model 127. As further described below, the candidate generation engine 123 can be coupled to a hash index database (not shown in FIG. 1) for rapid retrieval of attribute values stored in, for example, the records database 103, which saves processing time and/or computing resources. Examples of operations executed by the candidate generation engine 123 are further described below with reference to FIG. 11 and FIG. 12.

In some embodiments, the feature extraction engine 125 extracts or generates a set of features from attribute values of data records received by the system 100, such features can be then fed into the latent similarity identification machine learning model 127 to identify one or more data records that are latently similar, equivalent, or identical to an input data record based on one or more content characteristics. Examples of operations that can be executed by the feature extraction engine 125 are further described below with reference to FIGS. 4-8 and FIG. 15.

In some embodiments, the latent similarity identification machine learning model 127 can receive sets of paired attributes and similarity scores between such paired attributes to determine weight values associated with the sets of paired attributes. In some implementations, the latent similarity identification machine learning model 127 can utilize the weight values and the similarity scores to compute a final similarity score indicative of a latent similarity between, for example, two data records. The final similarity score can indicate multi-attribute similarities between two or more data records including Direct-linked attribute and cross-attribute similarities between two or more data records.

In some embodiments, a user or administrator may interact with the system 100 via a display 113 and a user input device interface 121. The input device interface 121 may include, e.g., a mouse, a keyboard, a touch panel of the display 113, motion tracking and/or detecting, a microphone, or an imaging device, such as a digital camera, among other input devices. In some implementations, results and statuses related to the system 100 and operations thereof may be displayed to the user via the display 113. For example, in some instances, a user can input a first data record to the system 100, and in response, the system 100 can identify and display a data record that is latently similar or identical to the input data record. In some other instances, a user can input two or more data records, and in response, the system 100 can output latent similarity scores between the two or more inputted data records.

As shown in FIG. 1, the communication bus 101 can also couple the system 100 to a network (e.g., network 1707 shown in FIG. 17) through a network communication interface 111. In this manner, the system 100 can be part of a network of computers (for example a local area network ("LAN"), a wide area network ("WAN"), or an Intranet, or a network of networks, for example, the Internet. Thus, the system 100 can receive inputs and transmit outputs or results to other computing devices via the network communication interface 111.

Figure 2:
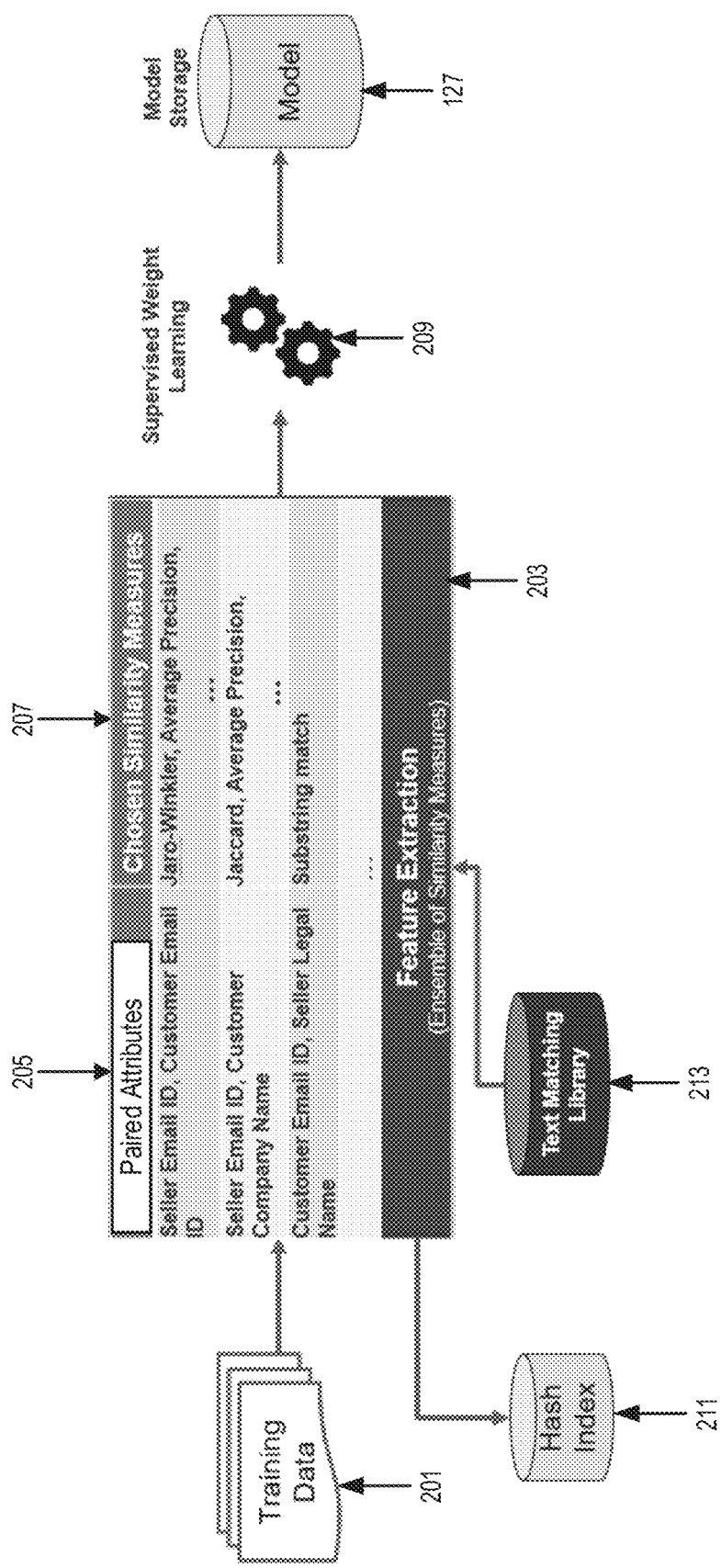

FIG. 2 illustrates an example of a training process of a latent similarity identification machine learning model, in accordance with one or more embodiments of the present disclosure. In some implementations, training data 201 can include sets of data records associated with one or more persons and non-person entities (also referred to herein as training data records). The data records included in the training data 201 may be distinct (i.e., may not have the same number and/or type of attributes). Moreover, the data records included in the training data 201 may have different attribute values even when such records are associated with the same entity. For instance, a first and a second data record may be associated with a person named John Doe; however, the first data record can include an email attribute with an attribute value of "jdoe@mymail.com" while the second data record can include the email attribute with an attribute value of "johnd@myotheremail.com." Likewise, the first data record may include a home address attribute while the second data record may not include a home address attribute but instead may have a business address attribute or no attribute indicative of an address.

In some embodiments, at 203, the system 100 can extract features from attribute values included in the training data records. In some implementations, the system 100 can extract features from paired attribute values included in the training data records. Paired attribute values can be attributes included in different data records, for example, a Seller Email ID attribute selected from a seller data record can be compared against a Customer Email ID attribute selected from a customer data record, other examples of paired attributes can include pairs such as Seller Email ID attribute vs. Customer Company Name attribute, and Customer Email ID attribute vs. Seller Legal Name attribute, and other suitable paired attributes as shown at 205. In some embodiments, latent features from paired attributes are extracted and used to compute similarity scores.

In some embodiments, text matching library 213 can store a dynamic list of similarity measures including custom similarity measures that can be leveraged to extract latent features and compute similarity scores for different attribute values and data records based on extracted latent features. As shown at 207, the system 100 can compute similarity scores for each pair of paired attributes. These measures can be broadly categorized as Lexical Measures and Semantic Measures.

Lexical Measures. For short text consisting of few words (e.g., 2 to 5 words), attribute matching can primarily focus on the surface level, by extracting lexical-based patterns from text. Lexical Measures focus on various aspects of lexical similarity, such as character offset comparison, set similarity, and other suitable lexical measures. In some instances, the system 100 utilizes lexical measures, as described in more detail below, to produce sets of lexical similarity scores.

Average Precision. Average Precision (AP) combines precision and recall producing balanced scores. AP favors matches in sequential order and is suitable for texts where sequential information is important (e.g., organization names). Average Precision is further described below with reference to FIG. 5 and FIG. 6.

Jaro-Winkler. Jaro-Winkler (JW) matches text threshold based on a difference in the characters' respective positions. It additionally favors matches towards beginning of text suitable for short textual strings (e.g., publication tile, product descriptions).

Jaccard Index. Jaccard Index or Similarity is a set similarity measure computed by a ratio of common items (set intersection) to all items (set union), and may be suitable for texts where sequencing is not important (e.g., email IDs). Jaccard Similarity measures are further discussed below with reference to FIG. 7 and FIG. 8.

Scaled Numeric Difference. Compares numeric values based on their absolute difference, scaled using a Sigmoid function to generate scores between 0 to 1.

Semantic Measures. For longer texts (e.g., product titles and descriptions), capturing semantics of text is crucial. In some embodiments, the system 100 can utilize Deep Learning based methods to learn distributed representations (DR) of words (a.k.a. embeddings) to bring semantically related words close to each other in geometric vector spaces. Such techniques can also aggregate DR at sentence level, or entire text level. Similarity measures can be then applied on word level, sentence level, or text level DRs. In some instances, the system 100 utilizes semantic measures as the ones described below to produce sets of semantic similarity scores.

Cosine similarity. Cosine Similarity captures vector space similarity through projection (i.e., dot product) of vectors. Given a pair of attributes to compare, this is done by finding the text level DR for each attribute value and then calculating the dot product of DRs.

Word Mover's Distance. Word Mover's Distance (WMD) measures semantic similarity between two text sentences as the minimum amount of distance that the DR of words of one text needs to "travel" to reach the DR of words of another text.

BERT based similarity. Bidirectional Encoder Representations from Transformers (BERT) provides representation from language model by learning deep bidirectional representations of unlabeled text in unsupervised mode. An unsupervised BERT model can be fine-tuned with one additional output layer for classification tasks. For each record pair, a score from a fine-tuned BERT model can be used as similarity measure.

The above are, of course, non-limiting examples of similarity measures. Other similarity measures can be equally used by the system 100, including substring match measures, range differences, term frequency-inverse document frequency (TF-IDF) measures, and other suitable types of similarity measures available in the text matching library 213.

In some embodiments, the system 100 can compute similarity scores according to one or more predefined criteria, for example, without limitation, based on attribute type, length of text to compare, or other suitable criteria based on one or more latent features associated with attribute values. For instance, similarity scores for numeric attributes can be computed based on range differences. Similarity scores for short text attributes, such as person names, may be computed based on average precision. Similarity scores for addresses where the sequence of words is not strictly followed may be computed based on Jaccard Similarity, whereas similarity scores for names where prefix based match is important may be computed based on Jaro-Winkler measures. Such criteria can be defined in, for example, text matching library 213, to efficiently deal with raw or unnormalized text that does not strictly follow naming conventions, and to efficiently deal with the presence of noise (e.g., misspellings, spelling variations).

In some embodiments, the text matching library 213 can include customized similarity measures utilized by the system 100 to compute similarity scores in special cases. For example, in a setting where a first record has three attributes, each of them having an attribute value corresponding to a different email address, and a second record has two attributes, each of them having an attribute value corresponding to a different email address, 6 combinations (3×2) of similarity scores can be generated. In such a case, while contribution/weight from each similarity score can be generated by the latent similarity identification machine learning model 127, a customized similarity measure can be equally utilized by the system 100. Such a customized similarity measure can be based on, for example, a 'maximum over 6' scoring scheme, to capture the highest match across any of the 6 possible combinations. Other examples of the customized similarity measures can include the use of background knowledge about, for example, common first/last names or other suitable attribute value to suppress spurious matches for names such as 'John Doe'.

In some embodiments, system 100 can build hash index database 211 to correlate features extracted from attribute values with one or more paired attribute values. Accordingly, system 100 can efficiently retrieve one or more paired attribute values from the hash index database 211 in response to a feature input. Examples of latent features that can be inputted into the hash index database are described below with reference to FIG. 12.

In some embodiments, the paired attributes 205 and the computed similarity measures 207 can be utilized to execute a supervised machine weight learning process 209 to train the latent similarity identification machine learning model 127. For example, the latent similarity identification machine learning model 127 can be trained to compute weights assigned to pairs of attribute values (or paired attribute values) and utilize such weights to generate a final similarity score indicative of a latent similarity between two or more data records.

In some embodiments, paired attributes 205 can be transformed into data structures representing a series of numeric dimensions. Such a transformation of the training data facilitates multiple alternatives to implement the latent similarity identification machine learning model 127, including implementations based on logistic regression models, support vector machine models, random forest machine models, and/or other suitable machine learning models.

In some embodiments, the latent similarity identification machine learning model 127 can be implemented through supervised ensemble machine learning techniques, for example, without limitation, as a gradient boosting machine learning model, or an extreme gradient boosting machine learning model.

Figure 3:
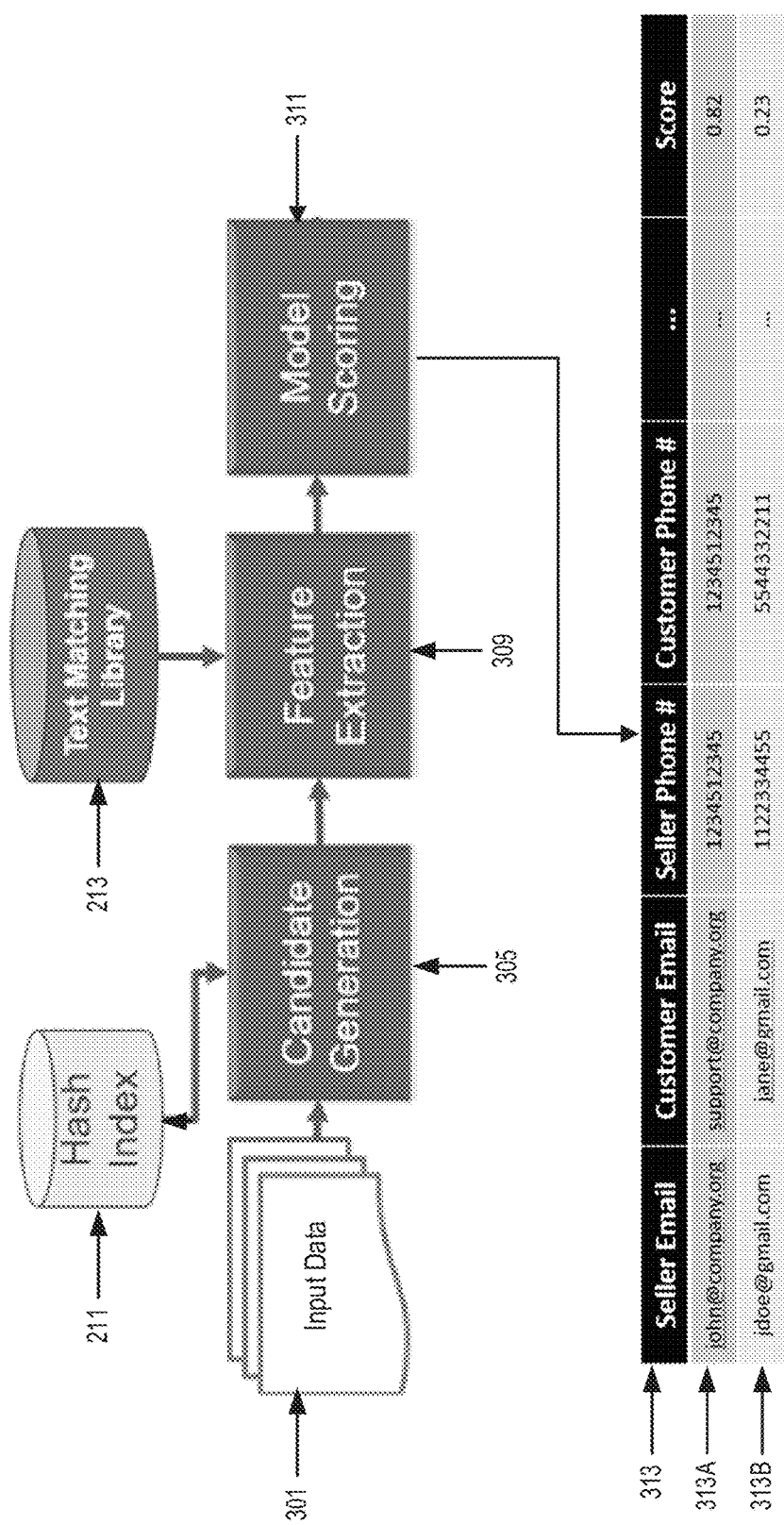

FIG. 3 is a flowchart illustrating examples of computations executed by the entity matching detection system 100 in accordance with one or more embodiments of the present disclosure. In some implementations, the system 100 can receive input data 301. Input data 301 can include, for example, a plurality of data records to be compared against each other or against a set of other data records stored, for example, in the record database 103 discussed with reference to FIG. 1. Each data record received in the input 301 may include a set of attribute values. In some instances, during a candidate generation 305, the system 100 can be programmed to send attribute values to the hash index database 211 and, in response, receive one or more attribute values associated with candidate data records. The received candidate data records may have a significant similarity with the data records included in the input 301, and thus, utilizing a hash index database may save time and processing power when, for example, a data record needs to be exhaustively compared against a large number of data records. Thereafter, at 309, the system 100 can be programmed to execute a feature extraction process in which paired attributes between different records are identified and latent features from such paired attributes are extracted and computed. Similarity scores between paired attribute values can be computed based on data and criteria stored in the text matching library 213 as discussed above with reference to FIG. 2.

In some embodiments, paired attribute values from different data records and their similarity scores are input into the latent similarity identification machine learning model 127 (discussed with reference to FIG. 1) to execute the model scoring process 311. An example of an output of the model scoring process 311 is shown as output 313. For example, the output 313 illustrates final similarity scores indicative of latent similarities between sets of records. For example, row 313A shows that the final similarity score between a seller data record and a customer data record is 0.82. It can be appreciated that the seller data record has distinct attributes from the customer data record (e.g., seller data record includes the attributes Seller Email and Seller Phone #, while customer data record includes the attributes Customer Email and Customer Phone #). Yet, they have at least one attribute value in common, i.e., the seller phone number and the customer phone number are the same (i.e., hard match "1234512345"). Accordingly, the score between the records shown in row 313A can be considered significant. It is noted, that unlike the example discussed with respect to row 313A, a final similarity score between two data records can still be meaningful even when those data records do not have any attribute value in common (e.g., there are no hard matches between their attribute values). For example, row 313B shows that the final similarity score between a seller data record and a customer data record is 0.23 because the latent similarities between the Seller Email attribute "jdoe@gmail.com" and the Customer Email attribute "jane@gmail.com" are identified and weighted by the latent similarity identification machine learning model 127.

Figure 4:
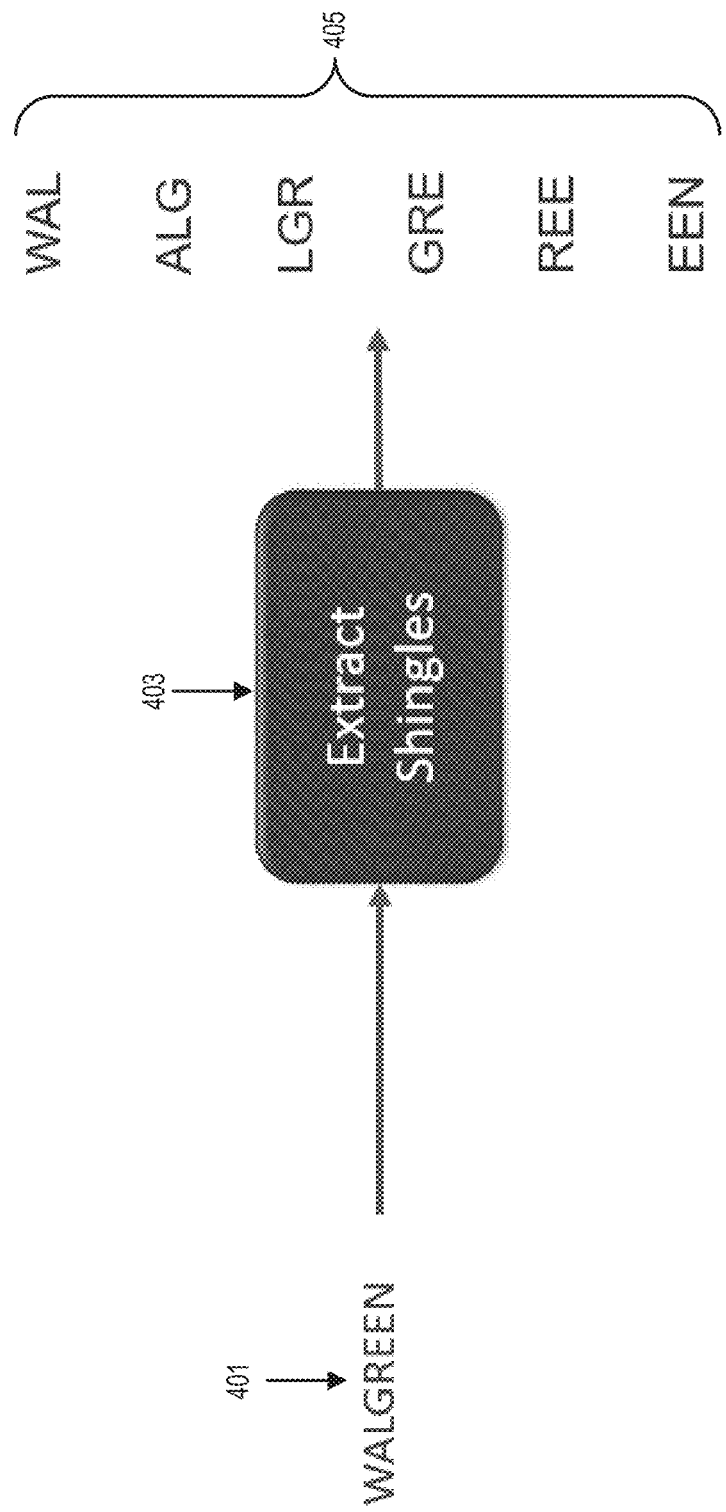

FIG. 4 illustrates an example of how latent features are extracted from attribute values, in accordance with one or more embodiments of the present disclosure. In some implementations attribute values from input data records and candidate data records can be decomposed into N-grams data structures that are representative of latent features. N-grams data structures store overlapping character sequences obtained by moving a sliding window of size N. For example, attribute value 401 can be decomposed into a set of six N-grams data structures as shown at 405 via the extract N-grams process 403. The extraction N-grams process 403 can be implemented, for example, by recurrently extracting substrings from the attribute value until the characters in the attribute value are exhausted. The latent features in the form of extracted N-grams data structures are used to compute similarity scores as discussed below with reference to FIGS. 5-8.

Figure 5:
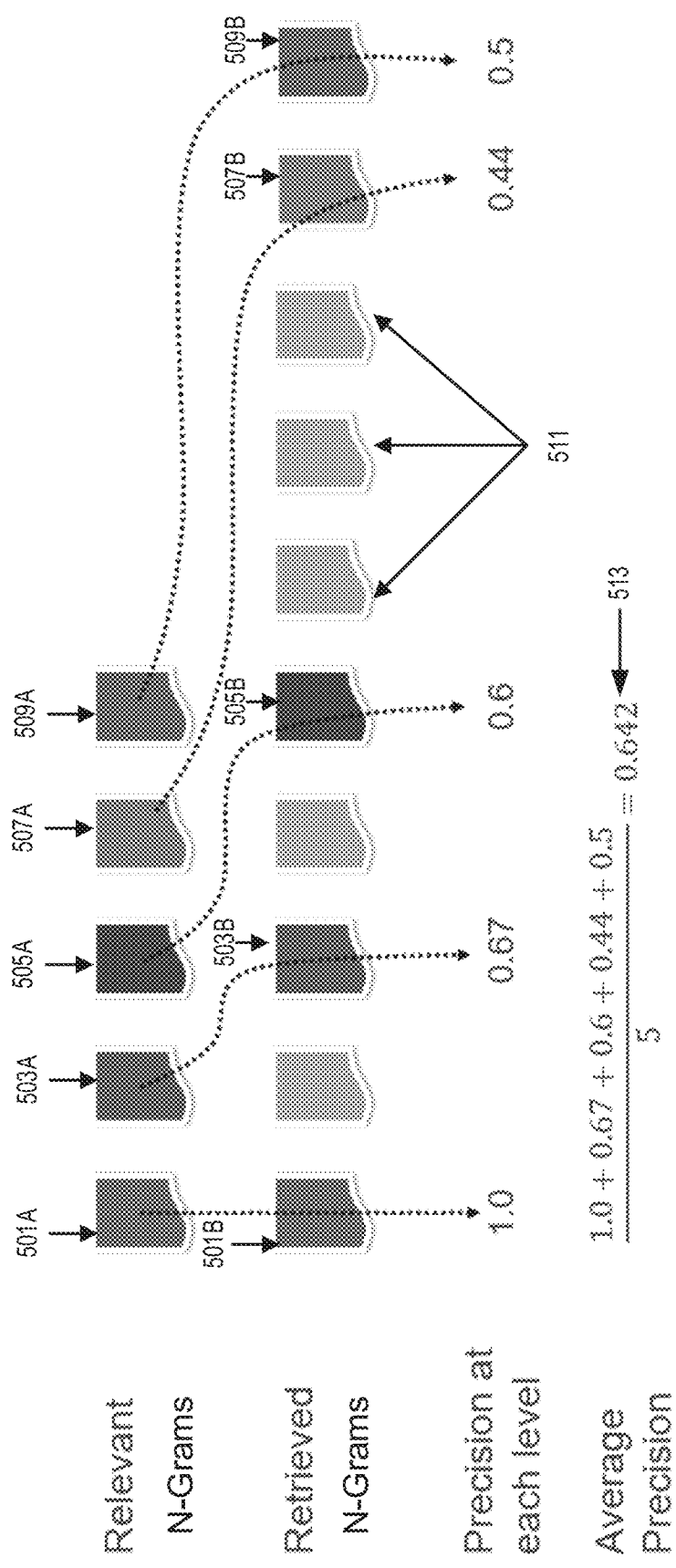

FIG. 5 illustrates an example of a similarity score computed from N-grams data structures extracted from different attribute values, in accordance with one or more embodiments of the present disclosure. In some implementations, a similarity score between two attribute values can be generated by computing the average precision between the two attribute values. For example, in FIG. 5 the set of relevant N-grams (501A, 503A, 505A, 507A, and 509A) can correspond to N-grams extracted from a first attribute value while the set of retrieved N-grams (501B, 503B, 505B, 507B, and 509B) can correspond to N-grams extracted from a second attribute value. The first attribute value can be part of a first data record while the second attribute value can be part of a second data record. N-grams data structures 511 represent examples of unmatched N-grams. The average precision between the two sets of N-grams can be computed as shown at 513 and can be used as a similarity score between the first attribute value and the second attribute value.

FIG. 6 illustrates examples of similarity scores computed from N-grams data structures extracted from different attribute values, in accordance with one or more embodiments of the present disclosure. As discussed above, attribute values can be decomposed into sets of N-grams data structures, examples of such decompositions are shown at 601. It is appreciated that average precision correctly distinguishes between true and false matches. For example, the average precision between "UBER" and "UBER LLC" is 1 as shown at 603A, while the average precision between "UBER" and "BERGER" is 0.25 as shown at 605A. In some instances, average precision may be superior to similarity scores generated by calculating edit distances, as shown in 603B and 605B, because edit distance may fail to distinguish between true/false matches.

Figure 7:
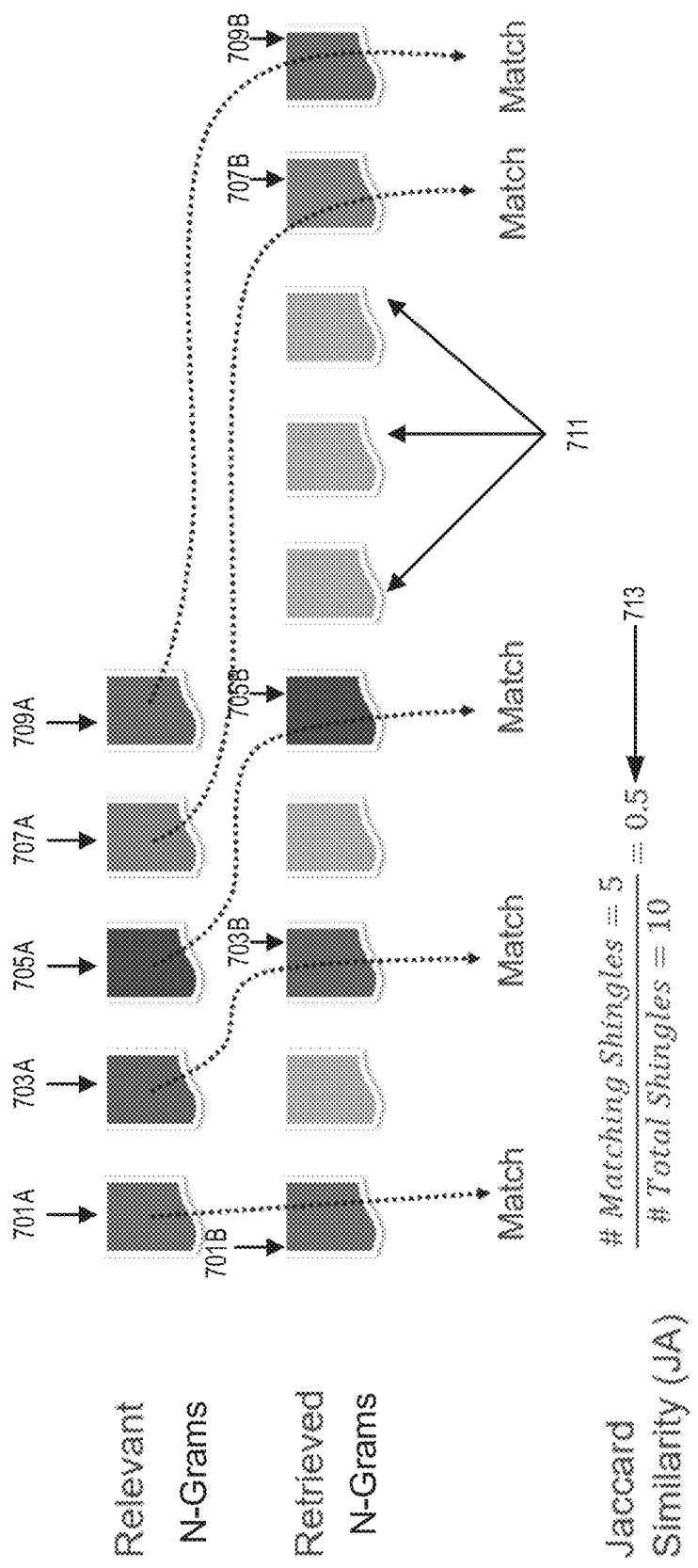

FIG. 7 illustrates another example of a similarity score computed from N-grams data structures extracted from different attribute values, in accordance with one or more embodiments of the present disclosure. In some implementations, a similarity score between two attribute values can be generated by computing the Jaccard Similarity between the two attribute values. For example, in FIG. 7 the set of relevant N-grams (701A, 703A, 705A, 707A, and 709A) can correspond to N-grams extracted from a first attribute value, while the set of retrieved N-grams (701B, 703B, 705B, 707B, and 709B) can correspond to N-grams extracted from a second attribute value. The first attribute value can be part of a first data record, while the second attribute value can be part of a second data record. N-grams data structures 711 represent examples of unmatched N-grams. The Jaccard Similarity between the two sets of N-grams can be computed as shown at 713 and used as a similarity score between the first attribute value and the second attribute value.

FIG. 8 illustrates examples of similarity scores computed from N-grams data structures extracted from different attribute values, in accordance with one or more embodiments of the present disclosure. As discussed above, attribute values can be decomposed into sets of N-grams data structures, examples of such decompositions are shown at 801. It is appreciated that Jaccard Similarity correctly distinguishes between true and false matches. For example, the Jaccard Similarity between "UBER" and "UBER LLC" is 0.4 as shown at 803A while the Jaccard Similarity between "UBER" and "BERGER" is 0.2 as shown at 805A. In some instances, Jaccard Similarity may be superior to similarity scores generated by calculating edit distances, as shown in 803B and 805B, because edit distance may fail to distinguish between true/false matches.

Figure 9:
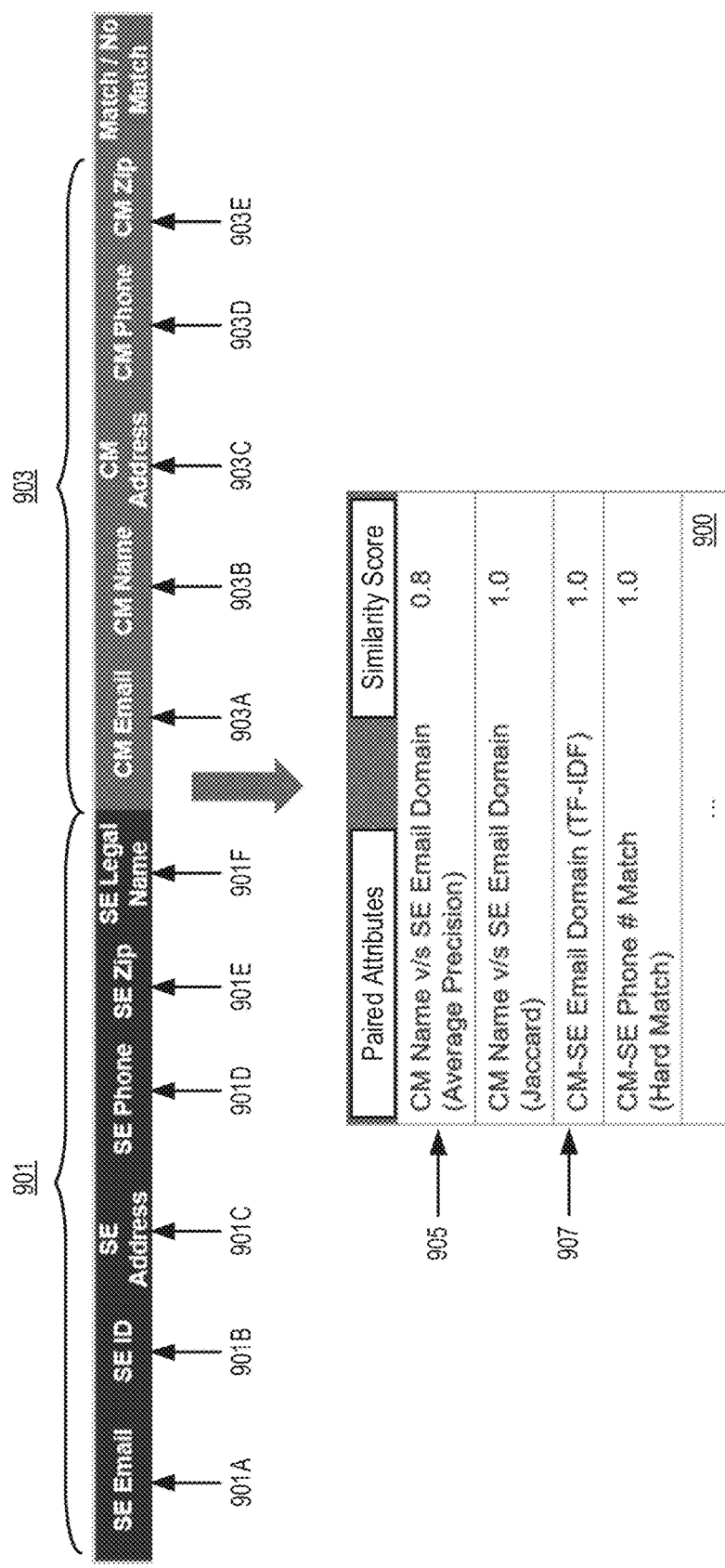

FIG. 9 illustrates an example of a feature extraction process, in accordance with one or more embodiments of the present disclosure. As discussed above, latent features can be extracted from two different data records, for example, data record 901 and data record 903. The system 100 can compare data records regardless of whether the data records have a different number of attributes and different attributes. For example, data record 901 includes six attributes (901A, 901B, 901C, 901D, 901E, and 901F) while data record 903 includes five attributes (903A, 903B, 903C, 903D, and 903E). Data record 901 contains attribute values associated with a seller. In contrast, data record 903 contains attribute values associated with a customer. Attribute values from data record 901 can be paired and compared against any of the attribute values of data record 903, i.e., paired attribute values can be selected from any of the attributes included in data record 901 and any of the attribute values of data record 903. As discussed above, similarity scores can be generated for each pair of paired attributes utilizing similarity measures as described with respect to the text matching library 213. For example, at 905 the attribute value of a customer name is compared against the attribute value of a seller's email domain and a similarity score of 0.8 is generated. Likewise, at 907 the attribute value of a customer's email domain is compared against the attribute value of a seller's email domain and a similarity score of 1.0 is generated.

Figure 10:
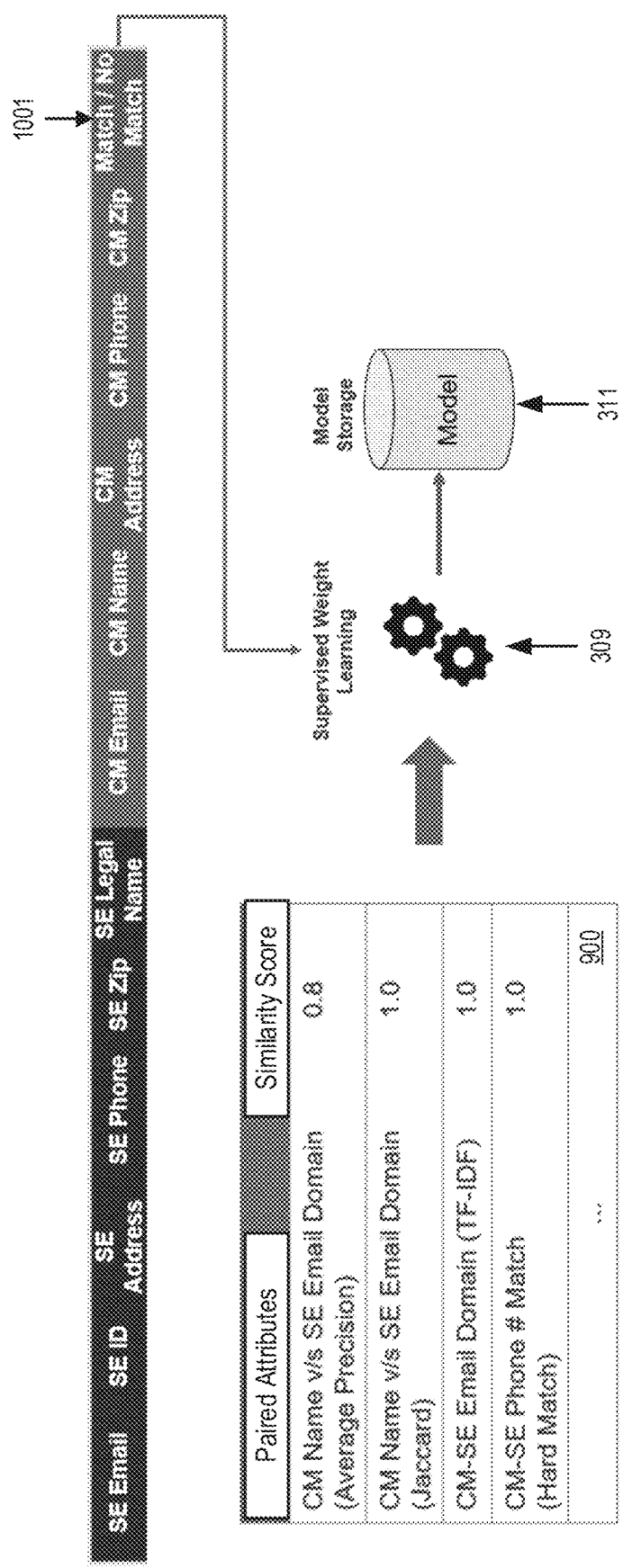

FIG. 10 illustrates an example of a supervised machine learning process, in accordance with one or more embodiments of the present disclosure. In some implementations, the latent similarity identification machine learning model 127 can be trained utilizing similarity scores generated from paired attributes, as shown at 900, and labeled records, e.g., labeled as match or no match. A match label may mean that a pair of records refer or are associated with the same entity. Such match labels or annotations are represented at 1001. Converted textual data from data records to numeric features allows the implementation of multiple machine learning models. For example, given that similarity measures may exhibit non-linear correlation over certain inputs, a gradient boosting based machine learning model can be trained to implement the latent similarity identification machine learning model 127.

Gradient boosting models give a weight to each observation and changes the weight after the training of a classifier. The weight to the wrongly classified observation is increased and the weight to the correctly classified observation is reduced. The observations whose weights have been modified are used to train a subsequent classifier. A gradient boosting model is a sequential ensemble modeling technique that can be implemented in a step-by-step method by focusing on the gradient reduction of a loss function in previous models. The loss function may be interpreted as the degree of error by the model. In general, the greater the loss function, the more likely the model will miss. As the purpose is to minimize the loss function and the error rate, a useful technique is to bring the loss function to decline in the gradient direction.

In some embodiments, the latent similarity identification machine learning model 127 can be implemented as a gradient boosting decision tree (GBDT). A GBDT is an iterative model process for decision trees. A regression tree and a gradient boosting model can be combined into decision trees, with a predefined trimming. Multiple decision trees are built in the training process, with each tree gradient down by learning from the n−1 number of the tree. Finally, based on the aggregation of all the trees, weights can be produced to generate the final similarity score indicative of a latent similarity between records, i.e., a solution to the entity matching problem.

In some embodiments the latent similarity identification machine learning model 127 can be implemented as an eXtreme gradient boosting tree (XGBoost). An XGBoost model is an optimized version of a gradient boosting machine. The main improvement on GBDT is the normalization of the loss function to mitigate model variances. This also reduces the complexities of modeling and hence the likelihood of model over-fitness. The XGBoost model supports linear classifiers, applicable not only to classifications but also to linear regressions. The traditional GBDT approach only deals with the first derivative in learning, but XGBoost improves the loss function with Taylor expansion. While the level of complexities increases for the learning of trees, the normalization prevents the problems associated with over-fitness. In a similar way to the implementation discussed above regarding GBDT, based on the aggregation of all the trees, weights can be produced to generate the final similarity score indicative of a latent similarity between records, i.e., a solution to the entity matching problem.

Although various implementations of the latent similarity identification machine learning model 127 have been discussed with reference to gradient boosting decision trees and extreme gradient boosting decision trees, it is noted that the latent similarity identification machine learning model 127 can be similarly implemented using other machine learning techniques including, but not limited to, neural networks, logistic regression models, support vector machine models, random forest models, and other suitable machine learning modeling techniques.

Figure 11:
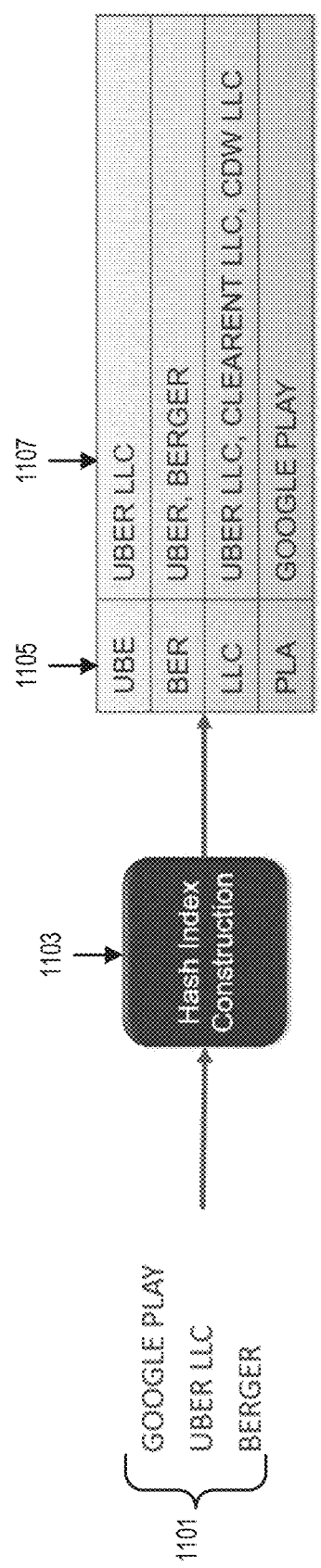

FIG. 11 illustrates an example of an implementation of a hash index database, in accordance with one or more embodiments of the present disclosure. In some embodiments, as discussed with reference to FIG. 2 and FIG. 3, a hash index database 211 can be utilized to retrieve candidate attribute values to compare with attribute values extracted from input data records. The hash index database 211 can rapidly retrieve attribute values, and thus, can save processing time and computing resources otherwise needed when, for example, the system 100 executes an exhaustive comparison of data records.

In some embodiments, the hash index database 211 can be generated during the training phase of the latent similarity identification machine learning model 127 discussed in FIG. 2. The hash index database 211 can be built by the execution of the hash index construction process 1103. During the hash index construction process 1103, attribute values from a set of attribute values 1101 are decomposed into N-grams data structures. Each N-grams data structure is associated in the hash index database with at least one attribute value. For example, N-grams data structure "BER" shown in column 1105 is associated with two attribute values "UBER" and "BERGER."

Figure 12:
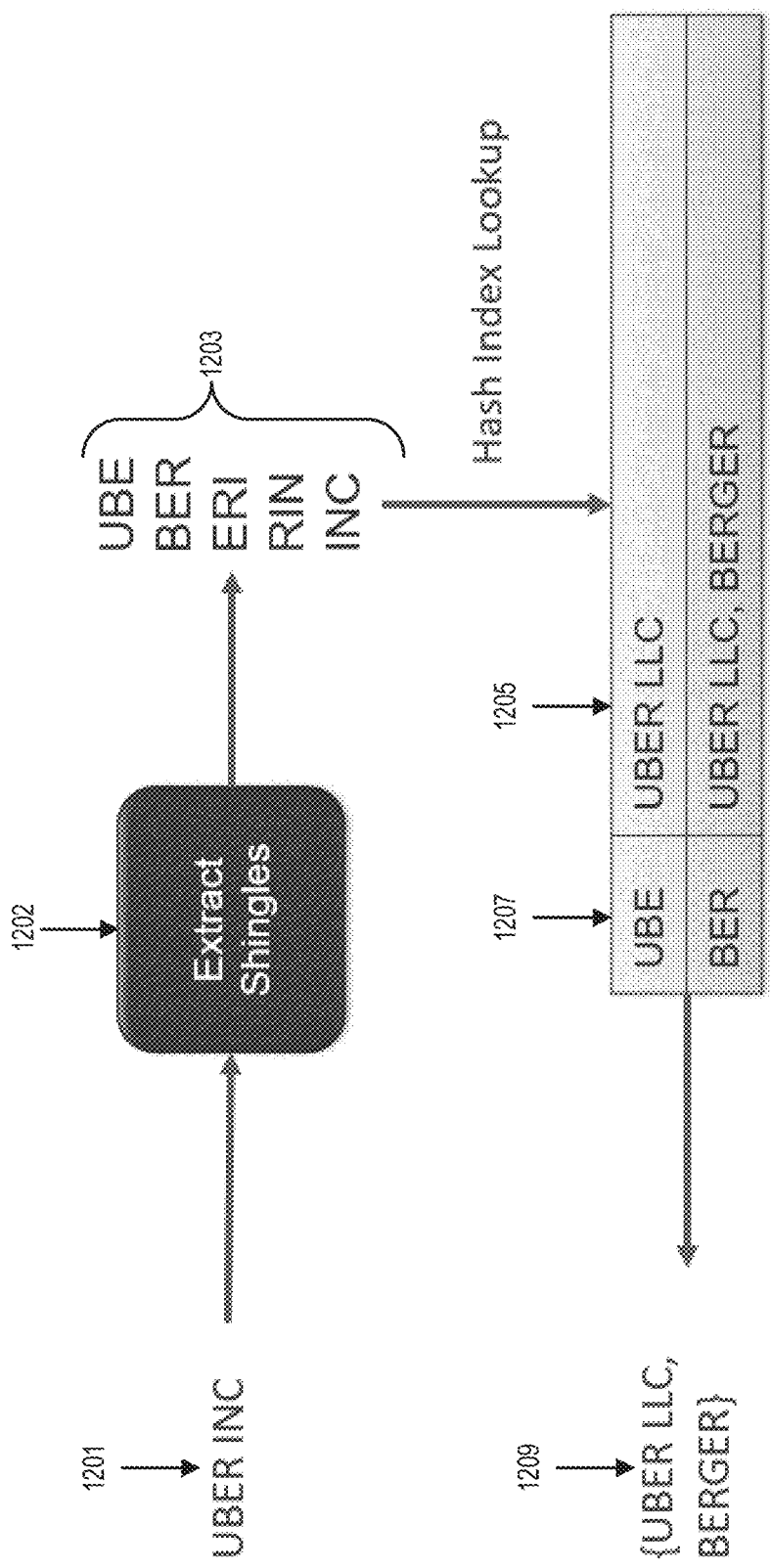

FIG. 12 illustrates an example of a candidate generation process, in accordance with one or more embodiments of the present disclosure. As discussed above, a candidate generation engine 123 (FIG. 1) can retrieve candidate data (e.g., attribute values) that may be similar to an input data value (e.g., an attribute value of an input data record). In some instances, a candidate generation engine can receive an attribute value 1201 and extract N-grams data structures as shown at 1202 from the attribute value 1201, examples of such N-grams data structures are shown at 1203. Thereafter, a hash index lookup query is performed into the hash index database 211 wherein each N-grams data structure from the set 1203 is queried and attribute values associated with such N-grams data structures are retrieved and utilized as candidate attributes. For example, the N-grams data structure "UBE" shown in column 1207 is associated with attribute value "UBER LLC" and the N-grams data structure "BER" also shown in column 1207 is associated with attribute values "UBER LLC" and "BERGER" thus, the retrieved candidate attribute values include "UBER LLC" and "BERGER," as shown at 1209.

Figure 13:
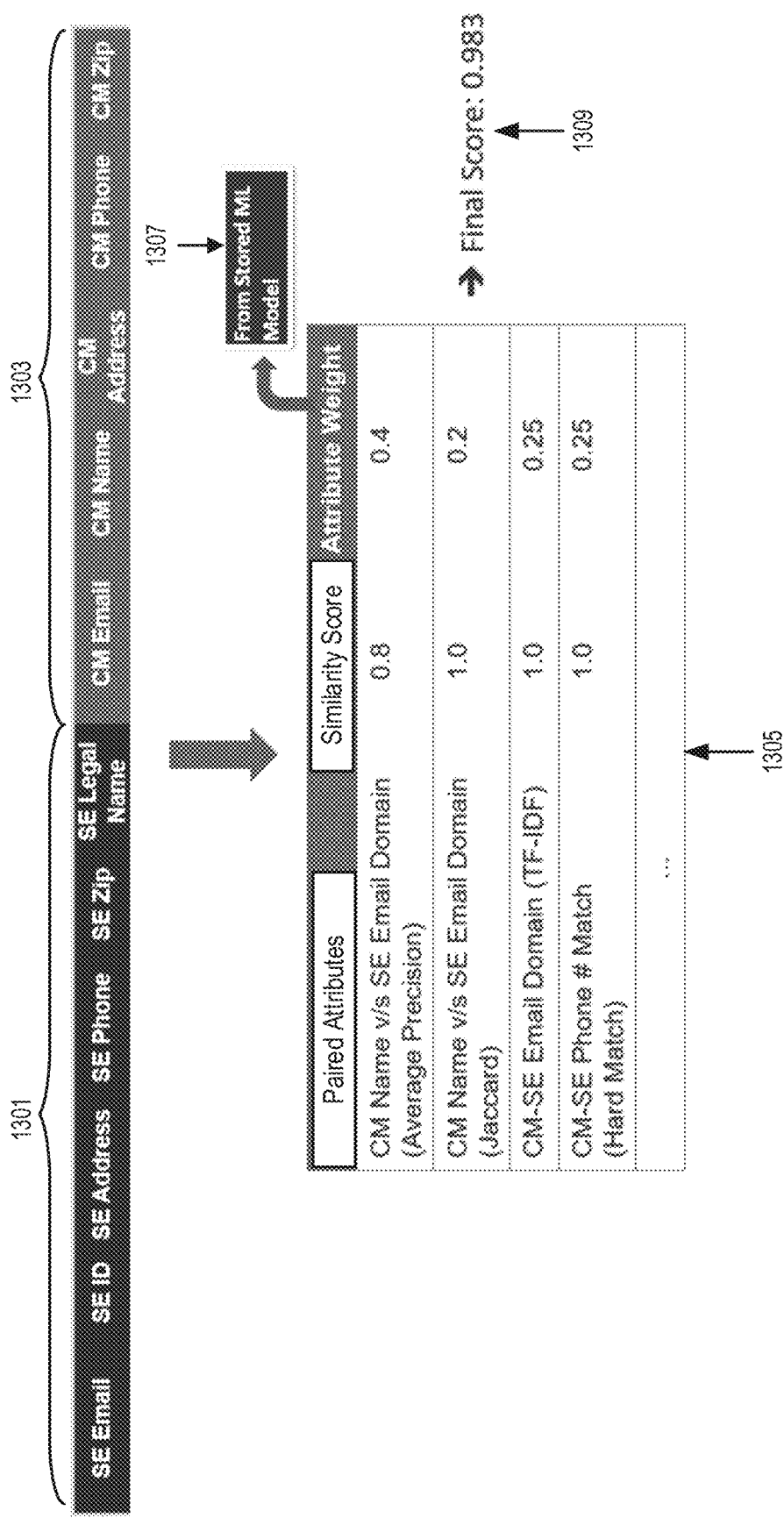

FIG. 13 illustrates an example of a model scoring process, in accordance with one or more embodiments of the present disclosure. In some implementations, when two data records are analyzed for similarities, e.g., data record 1301 and data record 1303. Paired attributes are selected and a similarity score is generated for each pair of attributes as shown at 1305. Such similarity scores are then paired with weights received from the trained latent similarity identification machine learning model 127 as shown at 1307.

In some embodiments, a final similarity score indicative of the latent similarity between the data record 1301 and the data record 1303 can be computed from the paired attribute values, the set of similarity scores and the attribute weights shown at 1305. Attribute weights shown at 1305 are the weights learned by the trained machine learning model 127. Such weights are gathered based on supervised data fed into the model. If P comparable attribute pairs were selected, and if S number of similarity measures are used over each of them, there will be P×S number of latent features with corresponding weights. The final similarity score indicative of the latent similarity between the data record 1301 and the data record 1303 shown at 1307, can be computed by component level multiplication of each attribute weight with a corresponding feature score for a given data instance, followed by a summation over all outputs from the component multiplications.

Figure 14:
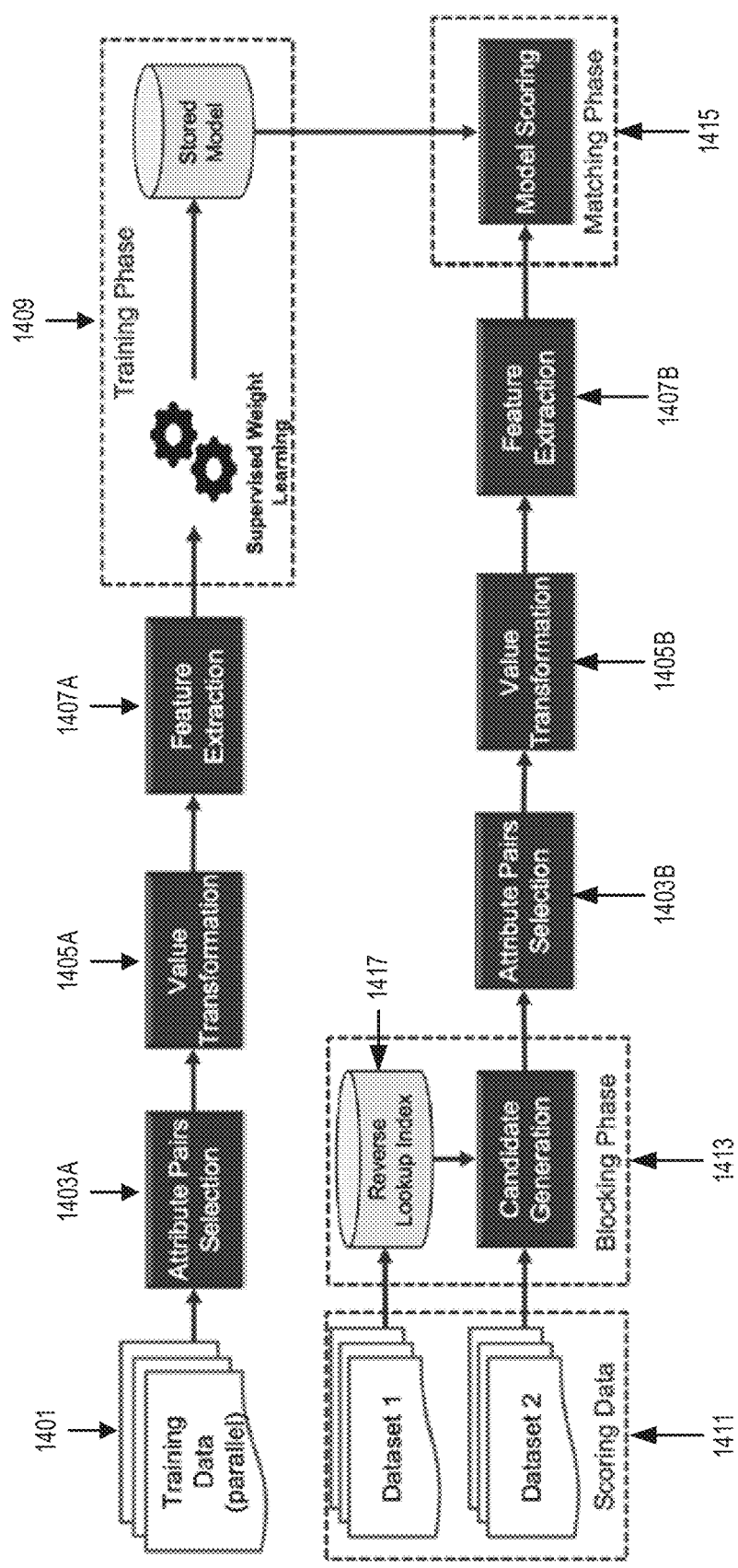

FIG. 14 illustrates a flow of an entity matching detection system showing training, blocking, and matching phases, in accordance with one or more embodiments of the present disclosure. Attribute Pairs Selection 1403A (training phase) and 1403B (matching phase) select attributes across data sources to be passed through similarity measures. Value Transformation 1405A (training phase) and 1405B (matching phase) and Feature Extraction 1407A (training phase) and 1407B (matching phase) process the records to construct feature vectors based on scores from similarity as discussed above. Training phase 1409 learns and stores model parameters based on extracted latent features and corresponding labels from training data. Given the scoring data, candidate records are determined against query record in blocking phase 1413. Each candidate record along with a given query record can undergo similar feature extraction. Using the trained model parameters, candidate scoring and ranking is executed during the matching phase 1415. The training data 1401 is utilized during the training phase 1409 to implement the latent similarity identification machine learning model 127. Scoring data 1411 represents unseen samples to be matched by the latent similarity identification machine learning model 127.

In some embodiments attribute pair selection 1403A and 1403B can be executed as follows, given two data sources with M and N attributes respectively, M×N attribute pairs can be formed. Attribute pairs can be distinguished based on the type of information they hold. Direct-linked attribute pairs are attributes across data sources that are aligned based on the information they hold (e.g., person name vs. person name). Multiple attributes within a data source may hold similar information (e.g., a data source may capture up to three phone numbers for a person) and may align with one or more attributes from the other data source. Cross-linked attribute pairs on the other hand share certain information but their attribute types may vary (e.g., person names vs. email IDs). System 100 uses Cross-linked attribute pairs to mine such information (either lexical or semantic). Factors including noise, lack of standardization, and business rules may result in information being shared across Cross-linked attributes. For example, people usually choose parts of their first name, last name, and date of birth while deciding their email addresses. This information is explicitly modeled by understanding the type of information shared across such attribute pairs.

In some embodiments, for a given dataset, the system 100 makes an informed choice of Cross-linked attribute pairs that can produce meaningful matches, in combination with Direct-linked attribute pairs. The number of such attribute pairs can become quadratic based on the number of attributes depending on the nature of a dataset, and we shortlist the most relevant ones. This filtering is made based on factors including schema metadata (e.g., numeric data need not be compared against textual strings), potentially shared information (e.g., person names may overlap with email IDs but not with physical addresses typically), and so on.

In some embodiments, the system 100 executes value transformations 1405A (training phase) and 1405B (matching phase) including the processing of records and attribute pairs before applying similarity measures. System 100 can execute value transformations at the data record level and at the attribute value level. Examples of value transformations can include:

Character N-grams Extraction. Since measures such as Average Precision and Jaccard Similarity expect a list or set as input, textual attribute values can be converted into sequences of N-grams data structures, containing overlapping character sequences obtained by moving a sliding window of size N, for example, N=3.

Distributed Representation Extraction. For semantic similarity measures such as Cosine Similarity or Word Mover Distance, a fast-text based implementation can be used to transform each attribute value to its distributed representation.

Attribute Concatenation. For BERT, all attributes values from given record pair (both sides rleft and rright) are concatenated in given sequence ignoring the attribute boundaries and separated by a special "[SEP]" token. This facilitates direct application of a fine-tuned BERT model to obtain a single similarity score against a given record pair.

In some embodiments, and as discussed above, the system 100 executes feature extractions 1407A (training phase) and 1407B (matching phase) generating similarity scores for pairs of attributes to obtain feature vectors used, for example, during the model training phase as shown at 1407A, and during the matching phase as shown at 1407B. An example of feature extraction flow, including attribute pairs selection and value transformations, is discussed below with reference to FIG. 15.

In some embodiments, a query record can be exhaustively matched against a record database (e.g., record database 103). In such cases, a reverse lookup index 1417 (or alternatively hash index database 211 as discussed above) can be used for blocking, i.e., to discard redundant comparisons between matching entities. Such an index can be built from the series of N-grams generated by value transformation processes (1405A and 1405B).

In some embodiments, matching phase 1415 receives two data records inputs and generates a final similarity score indicative of the latent similarity between the two data records based on feature weights learned during the training phase. In an exhaustive matching scenario, the matching process is repeated for each candidate record generated by blocking phase 1413. In some implementations, candidates can be ranked based on their respective similarity scores and the best match data records can be selected and output to a user computing device.

Figure 15:
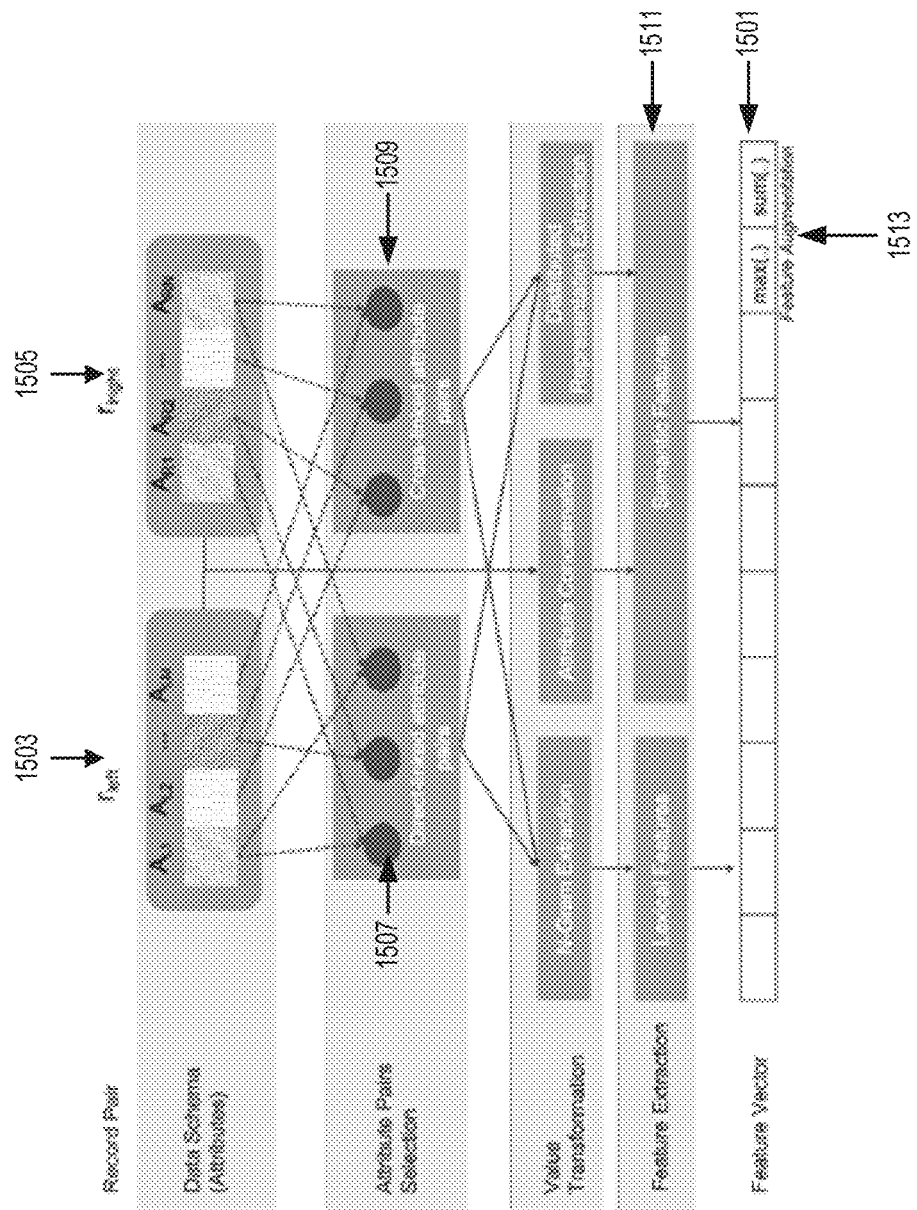

FIG. 15 illustrates a pair of records undergoing various transformations and feature extractions, in accordance with one or more embodiments of the present disclosure. In FIG. 15, a final feature vector 1501 can be generated from a pair of records 1503 and 1505. In some embodiments, final feature vectors, such as vector 1501, generated from two or more data records can include the following blocks of latent features.

Direct-linked Lexical Latent Features. Direct-linked attribute pairs 1507 share significant information. Features can be extracted from Direct-linked textual attribute pairs based on a series of similarity measures, including Average Precision, Jaccard Index, and Jaro-Winkler similarity measures, as described above. Likewise, features can be extracted from Direct-linked numeric attribute pairs based on, for example, scaled numeric difference measures.

Cross-linked Lexical Latent Features. Cross-linked attribute pairs are represented at 1509. Minimal pre-processing may be performed on Cross-linked attribute pairs for their comparison. For example, while comparing person names with email IDs, only the email handle part can be retained (appearing before '@' character); while comparing company names with email IDs, only the email domain part may be retained (appearing after '@' character).

Semantic Latent Features. In some embodiments, in addition to lexical latent features derived from Direct-linked and Cross-linked attribute pairs, system 100 can generate similarity scores by processing semantic similarity measures 1511 to capture conceptual matches. Some examples of similarity measures that can be used by system 100 include Word Mover Distance, Cosine Similarity as well as BERT based similarity score.

Feature Augmentation. In some embodiments, system 100 can handle spurious matches arising from frequently occurring tokens or words, such as 'John' in person name, or 'Technology' in organization name. For example, system 100 can scale scores from attribute level measures inversely proportional to value frequencies gathered from respective data sources to suppress such spurious matches as represented at 1513. In some instances, the overall strength of match between two data records may be dispersed across multiple low score matches (within or across groups). Accordingly, system 100 can execute 'sum(.)' operations as another feature to compute 'sum of all component wise scores' also shown at 1513.

Figure 16:
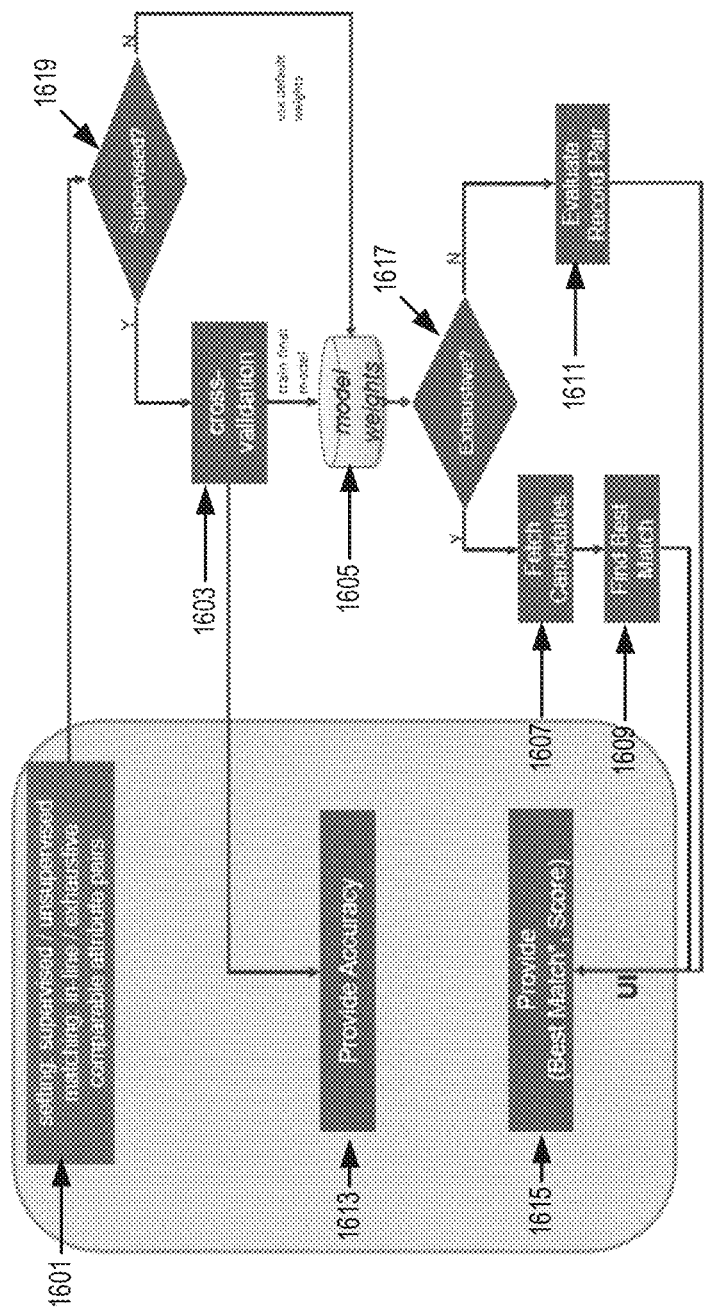

FIG. 16 illustrates a flowchart describing some of the operations executed by the entity matching detection system, in accordance with one or more embodiments of the present disclosure. In some implementations, a user or operator can select several operations settings for the entity matching detection system 100. For example, at 1601 a user can select to execute a supervised trained version of the latent similarity identification machine learning model 127 or an unsupervised version of the model 127. Likewise, a user can select to execute an in-line comparison of two data records inputted into the system 100 or a user can select to execute an exhaustive comparable attribute pairs, i.e., a data record is submitted into the system 100 and such a record is compared with records stored in a records database.

In some embodiments, as discussed above, the latent similarity identification machine learning model 127 can be trained via a supervised method, as shown at 1619. A supervised training method may include a cross-validation process 1603. Cross-validation is a resampling procedure used to evaluate the machine learning model 127 on a limited data sample. The cross-validation process 1603 can generate an accuracy 1613 or fitness measure indicative of how accurate the machine learning model 127 is at determining, for example, that a pair of records belong or are associated with a same entity. In some instances, when the cross-validation indicates that the machine learning model 127 has reached a predetermined accuracy threshold value, the machine learning model is ready to generate weights as shown at 1605 for latent features extracted from attribute values.

In some embodiments, a user can select to perform an exhaustive comparison of a data record against data records stored in a records database as shown at 1617. In such a case, the system 100 fetches candidate data records or candidate attribute values at 1607 as described above with respect to blocking phase discussed at 1413 FIG. 14 and candidate generation discussed at 305 FIG. 3. Thereafter, the system 100 can compute final similarity scores indicative of latent similarities between an input data record and fetched candidates and find the best match based on the final similarity scores as shown at 1609. In some instances, the system 100 can send to a user computing device a signal indicative of a set of data records from a record database that best match an input data record as shown at 1615. In some instances, a user may select to perform an in-line comparison of two data records instead of an exhaustive comparison as indicated in conditional element 1617. In such a case a user can input a pair of data records to the system 100, thereafter the pair of data records can be evaluated at 1611 and a final similarity score indicative of the latent similarity between the two records is provided to the user at 1615.

In some embodiments, the latent similarity identification machine learning model 127 can be trained with unsupervised machine learning techniques as indicated in conditional statement 1619. In some implementations, an unsupervised version of the machine learning model 127 can use an averaging scheme with uniform default weights. For example, if there are N feature components that are part of a final scoring, each can be given a 1/N weight. In such cases, learning/training phase may have no significance since the training data is absent. In some embodiments the unsupervised version of the latent similarity identification machine learning model 127 can be implemented, for example, via unsupervised clustering machine learning techniques such as hierarchical agglomerative techniques or other suitable clustering techniques.

Figure 17:
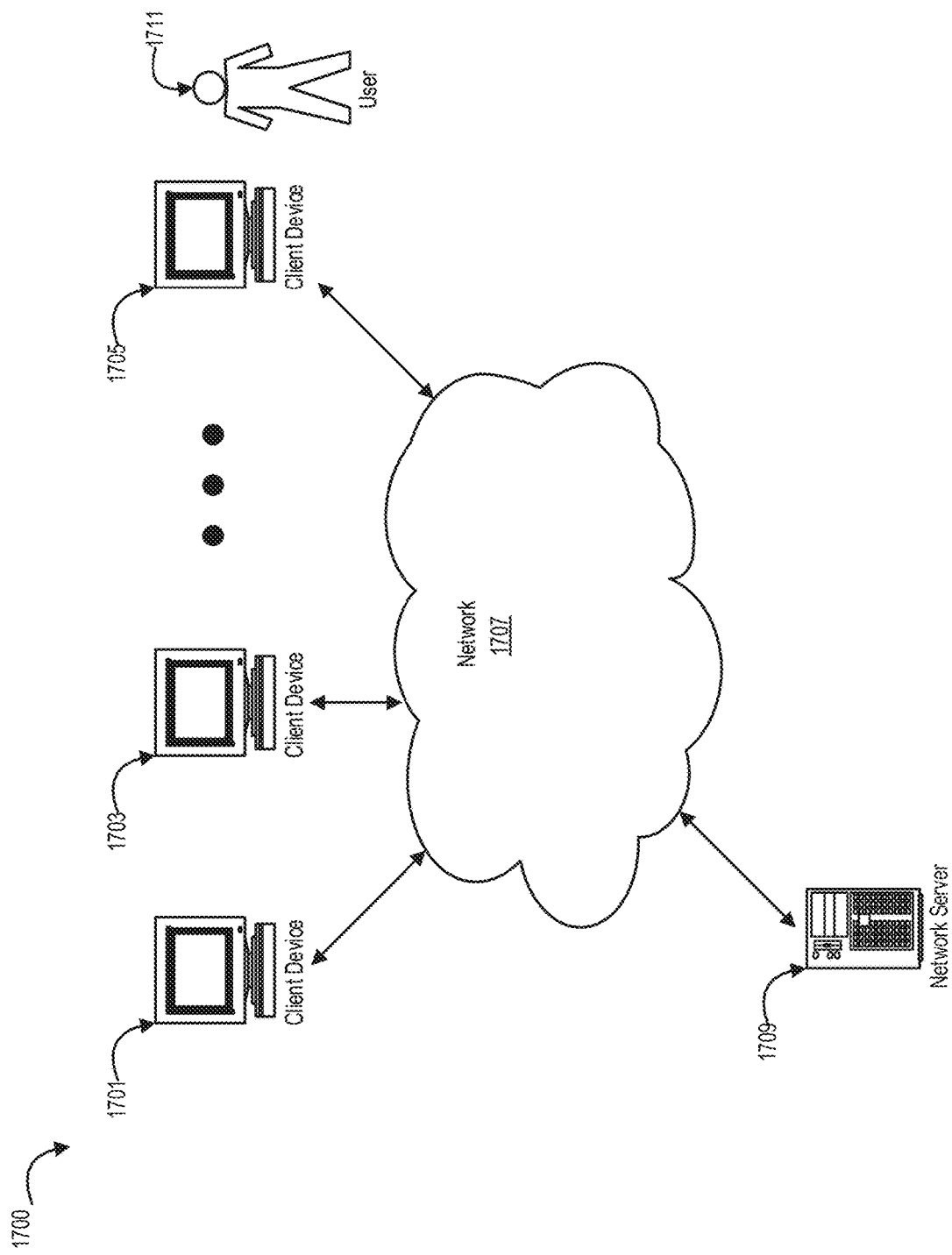

FIG. 17 depicts a block diagram of an example of a computer-based system 1700, in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the computing devices and/or the computing components of the computer-based system 1700 may be configured to manage large numbers of members and/or concurrent transactions or electronic activities, as detailed herein. In some embodiments, the computer-based system 1700 may be based on a scalable computer and/or network architecture that incorporates varies strategies for assessing the data, caching, searching, and/or database connection pooling. An example of the scalable architecture is an architecture that is capable of operating multiple servers.

In some embodiments, computing devices 1701, 1703, and 1705 (e.g., clients) of the computer-based system 1700 may include virtually any computing device capable of receiving and sending a message over a network (e.g., cloud network), such as network 1707, to and from another computing device, such as server 1709, and the like. In some embodiments the entity matching detection system 100 (discussed with reference to FIG. 1) can be implemented in the network server 1709. In some instances, a user 1711 in communication with client device 1705 can enter inputs and receive outputs from the network server 1709 via network 1707. In some embodiments, the computing devices 1701, 1703, and 1705 may be personal computers, multiprocessor systems, microprocessor-based or programmable consumer electronics, network PCs, and the like. In some embodiments, one or more computing devices 1701, 1703, and 1705 may include computing devices that typically connect using a wireless communications medium such as cell phones, smart phones, radio frequency (RF) devices, infrared (IR) devices, CBs, integrated devices combining one or more of the preceding devices, or virtually any mobile computing device, and the like. In some embodiments, one or more computing devices 1701, 1703, and 1705 may be devices that can connect using a wired or wireless communication medium, such as a wearable computer, laptop, tablet, desktop computer, netbook, video game device, pager, smartphone, ultra-mobile personal computer (UMPC), and/or any other device that is equipped to communicate over a wired and/or wireless communication medium. In some embodiments, computing devices 1701, 1703, and 1705 may run one or more applications, such as Internet browsers, mobile applications, voice calls, video games, videoconferencing, and email, among others. In some embodiments, computing devices 1701, 1703, and 1705 may be configured to receive and to send web pages, and the like. In some embodiments, a browser application of the present disclosure may be configured to receive and display graphics, text, multimedia, and the like, employing virtually any web based language including, but not limited to, Standard Generalized Markup Language (SGML), such as HyperText Markup Language (HTML), a wireless application protocol (WAP), a Handheld Device Markup Language (HDML), such as Wireless Markup Language (WML), WMLScript, XML, JavaScript, and the like. In some embodiments, computing devices 1701, 1703, and 1705 may be specifically programmed by either Java, .Net, QT, C, C++ and/or other suitable programming language. In some embodiments, computing devices 1701, 1703, and 1705 may be specifically programmed to include or execute an application to perform a variety of possible tasks, such as, without limitation, messaging functionality, browsing, searching, streaming or displaying various forms of content, including locally stored or uploaded messages, images and/or video.

In some embodiments, the network 1707 may provide network access, data transport and/or other services to any computing device coupled to it. In some embodiments, the network 1707 may include and implement at least one specialized network architecture that may be based at least in part on one or more standards set by, for example, without limitation, Global System for Mobile Communications (GSM) Association, the Internet Engineering Task Force (IETF), and the Worldwide Interoperability for Microwave Access (WiMAX) forum. In some embodiments, the network 1707 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 1707 may include and implement, as an alternative or in conjunction with one or more of the above, a WiMAX architecture defined by the WiMAX forum. In some embodiments and, optionally, in combination with any embodiment described above or below, the network 1707 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination with any embodiment described above or below, at least one computer network communication over the network 1707 may be transmitted based at least, in part, on one or more communication modes such as, but not limited to: Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof. In some embodiments, the network 1707 may also include mass storage, such as Network Attached Storage (NAS), a Storage Area Network (SAN), a Content Delivery Network (CDN) or other forms of computer or machine-readable media.

In some embodiments, the server 1709 may be, for example, a web server (or a series of servers) running a network operating system. In some embodiments, the server 1709 may be used for and/or provide cloud and/or network computing. Although not shown in FIG. 17, in some embodiments, the server 1709 may have connections to external systems like email, SMS messaging, text messaging, ad content providers, etc.

In some embodiments, the server 1709 may be specifically programmed to perform, in a non-limiting example, as authentication servers, search servers, email servers, social networking services servers, financial/banking-related services servers, travel services servers, or any similarly suitable service-base servers for users of computing devices 1701, 1703, and 1705.

In some embodiments and, optionally, in combination of any embodiment described above or below, for example, one or more computing member devices 1701, 1703, and 1705, the server 1709, may include a specifically programmed software module that may be configured to send, process, and receive information using a scripting language, a remote procedure call, an email, a tweet, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices, and others. In some embodiments, the non-transitory machine-readable medium can include one or more storage devices, and memory devices described above.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or Central Processing Unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

In some embodiments, computer-based systems of the present disclosure may be configured to utilize hardwired circuitry and/or hardware components that may be used in place of or in combination with software instructions to implement latent features extraction consistent with principles of the disclosure. Thus, implementations consistent with principles of the disclosure are not limited to any specific combination of hardware circuitry or hardware components and/or software In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

The aforementioned examples are, of course, illustrative and not restrictive.

At least some aspects of the present disclosure will now be described with reference to the following numbered clauses.

1. An apparatus, comprising:
    a processor; and
    a non-transitory memory storing instructions which, when executed by the processor, causes the processor to:
        receive a first data record from a computing device, wherein the first data record comprises a first set of attribute values;
        retrieve from a hash index database a second set of attribute values based on the first set of attribute values, wherein at least one first attribute value from the first set of attribute values is associated with at least one second attribute value from the second set of attribute values;
        retrieve from a records database a plurality of second data records based on the second set of attribute values;
        generate a third set of attribute values based on:
            i) the second set of attribute values, and
            ii) the plurality of second data records;
        wherein the third set of attribute values is distinct from the first set of attribute values;
        generate a set of similarity scores, wherein the set of similarity scores comprises similarity scores between each attribute value of the first set of attribute values and each attribute value of the third set of attribute values;
        generate a final similarity score indicative of a latent similarity between the first data record and a second data record of the plurality of second data records, by inputting into a trained latent similarity identification machine learning model:
            i) the first set of attribute values,
            ii) the third set of attribute values, and
            iii) the set of similarity scores; and
        identify a similar second data record of the plurality of second data records that is related to the first data record based on the final similarity score.
2. The apparatus of clause 1, wherein the first data record and the second data record are associated with a same entity.
3. The apparatus of any of the clauses 1 to 2, wherein the set of similarity scores comprises at least one lexical similarity score.
4. The apparatus of any of the clauses 1 to 3, wherein the set of similarity scores comprises at least one semantic similarity score.
5. The apparatus of any of the clauses 1 to 4, wherein the final similarity score indicative of the latent similarity between the first data record and a second data record is generated at least in part based on weight values generated by the trained latent similarity identification machine learning model and wherein the weight values are associated with the first set of attribute values, the second set of attribute values, and the set of similarity scores.
6. The apparatus of any of the clauses 1 to 5, wherein the set of similarity scores comprises similarity scores of cross-linked attribute pairs extracted from the first data record and the second data record.
7. The apparatus of any of the clauses 1 to 6, wherein the set of similarity scores comprises similarity scores of direct-linked attribute pairs extracted from the first data record and the second data record.
8. The apparatus of any of the clauses 1 to 7, wherein the trained latent similarity identification machine learning model is implemented based on a supervised ensemble machine learning technique.
9. A method, comprising:
    receiving, by a processor, a first data record from a computing device, wherein the first data record comprises a first set of attribute values;
    retrieving, by the processor, from a hash index database a second set of attribute values based on the first set of attribute values, wherein at least one first attribute value from the first set of attribute values is associated with at least one second attribute value from the second set of attribute values;
    retrieving, by the processor, from a records database a plurality of second data records based on the second set of attribute values;
    generating, by the processor, a third set of attribute values based on:
        i) the second set of attribute values, and
        ii) the plurality of second data records;
    wherein the third set of attribute values is distinct from the first set of attribute values;
    generating, by the processor, a set of similarity scores, wherein the set of similarity scores comprises similarity scores between each attribute value of the first set of attribute values and each attribute value of the third set of attribute values;
    generating, by the processor, a final similarity score indicative of a latent similarity between the first data record and a second data record of the plurality of second data records, by inputting into a trained latent similarity identification machine learning model:
        i) the first set of attribute values,
        ii) the third set of attribute values, and
        iii) the set of similarity scores; and
    identifying, by the processor, a similar second data record of the plurality of second data records that is related to the first data record based on the final similarity score.
10. The method of clause 9, wherein the first data record and the second data record are associated with a same entity.
11. The method of any of the clauses 9 to 10, wherein the set of similarity scores comprises at least one lexical similarity score.
12. The method of any of the clauses 9 to 11, wherein the set of similarity scores comprises at least one semantic similarity score.
13. The method of any of the clauses 9 to 12, wherein the final similarity score indicative of the latent similarity between the first data record and a second data record is generated at least in part based on weight values generated by the trained latent similarity identification machine learning model and wherein the weight values are associated with the first set of attribute values, the second set of attribute values, and the set of similarity scores.
14. The method of any of the clauses 9 to 13, wherein the set of similarity scores comprises similarity scores of cross-linked attribute pairs extracted from the first data record and the second data record.
15. The method of any of the clauses 9 to 14, wherein the set of similarity scores comprises similarity scores of direct-linked attribute pairs extracted from the first data record and the second data record.

16. The method of any of the clauses 9 to 15, wherein the trained latent similarity identification machine learning model is implemented based on a supervised ensemble machine learning technique.

17. A non-transitory computer readable medium comprising code which, when executed by a processor, causes the processor to:
receive a first data record from a computing device, wherein the first data record comprises a first set of attribute values;
retrieve from a hash index database a second set of attribute values based on the first set of attribute values, wherein at least one first attribute value from the first set of attribute values is associated with at least one second attribute value from the second set of attribute values;
retrieve from a records database a plurality of second data records based on the second set of attribute values;
generate a third set of attribute values based on:
  i) the second set of attribute values, and
  ii) the plurality of second data records;
wherein the third set of attribute values is distinct from the first set of attribute values;
generate a set of similarity scores, wherein the set of similarity scores comprises similarity scores between each attribute value of the first set of attribute values and each attribute value of the third set of attribute values;
generate a final similarity score indicative of a latent similarity between the first data record and a second data record of the plurality of second data records, by inputting into a trained latent similarity identification machine learning model:
  i) the first set of attribute values,
  ii) the third set of attribute values, and
  iii) the set of similarity scores; and
identify a similar second data record of the plurality of second data records that is related to the first data record based on the final similarity score.

18. The non-transitory computer readable medium of clause 17, wherein the first data record and the second data record are associated with a same entity.

19. The non-transitory computer readable medium of any of the clauses 17 to 18, wherein the set of similarity scores comprises at least one lexical similarity score.

20. The non-transitory computer readable medium of any of the clauses 17 to 19, wherein the set of similarity scores comprises at least one semantic similarity score.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

The invention claimed is:

1. An apparatus, comprising:
a processor; and
a non-transitory memory storing instructions which, when executed by the processor, cause the processor to:
receive a first data record from a computing device, wherein the first data record comprises a first set of attribute values;
retrieve from a hash index database a second set of attribute values based on the first set of attribute values, wherein at least one first attribute value from the first set of attribute values is associated with at least one second attribute value from the second set of attribute values;
retrieve from a records database a plurality of second data records based on the second set of attribute values;
generate a third set of attribute values based on:
  i) the second set of attribute values and
  ii) the plurality of second data records;
wherein the third set of attribute values is distinct from the first set of attribute values;
generate a set of similarity scores, wherein the set of similarity scores comprises similarity scores between each attribute value of the first set of attribute values and each attribute value of the third set of attribute values;
generate a final similarity score indicative of a latent similarity between the first data record and a second data record of the plurality of second data records, by inputting into a trained latent similarity identification machine learning model:
  i) the first set of attribute values,
  ii) the third set of attribute values, and
  iii) the set of similarity scores; and
identify a similar second data record of the plurality of second data records that is related to the first data record based on the final similarity score.

2. The apparatus of claim 1, wherein the first data record and the second data record are associated with a same entity.

3. The apparatus of claim 1, wherein the set of similarity scores comprises at least one lexical similarity score.

4. The apparatus of claim 1, wherein the set of similarity scores comprises at least one semantic similarity score.

5. The apparatus of claim 1, wherein the final similarity score indicative of the latent similarity between the first data record and the second data record is generated at least in part based on weight values generated by the trained latent similarity identification machine learning model and wherein the weight values are associated with the first set of attribute values, the second set of attribute values, and the set of similarity scores.

6. The apparatus of claim 1, wherein the set of similarity scores comprises similarity scores of cross-linked attribute pairs extracted from the first data record and the second data record.

7. The apparatus of claim 1, wherein the set of similarity scores comprises similarity scores of direct-linked attribute pairs extracted from the first data record and the second data record.

8. The apparatus of claim 1, wherein the trained latent similarity identification machine learning model is implemented based on a supervised ensemble machine learning technique.

9. A method, comprising:
receiving, by a processor, a first data record from a computing device, wherein the first data record comprises a first set of attribute values;
retrieving, by the processor, from a hash index database a second set of attribute values based on the first set of attribute values, wherein at least one first attribute value from the first set of attribute values is associated with at least one second attribute value from the second set of attribute values;

retrieving, by the processor, from a records database a plurality of second data records based on the second set of attribute values;

generating, by the processor, a third set of attribute values based on:
   i) the second set of attribute values, and
   ii) the plurality of second data records;
wherein the third set of attribute values is distinct from the first set of attribute values;

generating, by the processor, a set of similarity scores, wherein the set of similarity scores comprises similarity scores between each attribute value of the first set of attribute values and each attribute value of the third set of attribute values;

generating, by the processor, a final similarity score indicative of a latent similarity between the first data record and a second data record of the plurality of second data records, by inputting into a trained latent similarity identification machine learning model:
   i) the first set of attribute values,
   ii) the third set of attribute values, and
   iii) the set of similarity scores; and identifying, by the processor, a similar second data record of the plurality of second data records that is related to the first data record based on the final similarity score.

10. The method of claim 9, wherein the first data record and the second data record are associated with a same entity.

11. The method of claim 9, wherein the set of similarity scores comprises at least one lexical similarity score.

12. The method of claim 9, wherein the set of similarity scores comprises at least one semantic similarity score.

13. The method of claim 9, wherein the final similarity score indicative of the latent similarity between the first data record and the second data record is generated at least in part based on weight values generated by the trained latent similarity identification machine learning model and wherein the weight values are associated with the first set of attribute values, the second set of attribute values, and the set of similarity scores.

14. The method of claim 9, wherein the set of similarity scores comprises similarity scores of cross-linked attribute pairs extracted from the first data record and the second data record.

15. The method of claim 9, wherein the set of similarity scores comprises similarity scores of direct-linked attribute pairs extracted from the first data record and the second data record.

16. The method of claim 9, wherein the trained latent similarity identification machine learning model is implemented based on a supervised ensemble machine learning technique.

17. A non-transitory computer readable medium comprising code which, when executed by a processor, causes the processor to:

receive a first data record from a computing device, wherein the first data record comprises a first set of attribute values;

retrieve from a hash index database a second set of attribute values based on the first set of attribute values, wherein at least one first attribute value from the first set of attribute values is associated with at least one second attribute value from the second set of attribute values;

retrieve from a records database a plurality of second data records based on the second set of attribute values;

generate a third set of attribute values based on:
   i) the second set of attribute values, and
   ii) the plurality of second data records;
wherein the third set of attribute values is distinct from the first set of attribute values;

generate a set of similarity scores, wherein the set of similarity scores comprises similarity scores between each attribute value of the first set of attribute values and each attribute value of the third set of attribute values;

generate a final similarity score indicative of a latent similarity between the first data record and a second data record of the plurality of second data records, by inputting into a trained latent similarity identification machine learning model:
   i) the first set of attribute values,
   ii) the third set of attribute values, and
   iii) the set of similarity scores; and identify a similar second data record of the plurality of second data records that is related to the first data record based on the final similarity score.

18. The non-transitory computer readable medium of claim 17, wherein the first data record and the second data record are associated with a same entity.

19. The non-transitory computer readable medium of claim 17, wherein the set of similarity scores comprises at least one lexical similarity score.

20. The non-transitory computer readable medium of claim 17, wherein the set of similarity scores comprises at least one semantic similarity score.

* * * * *